(12) United States Patent
Kim et al.

(10) Patent No.: US 11,325,443 B2
(45) Date of Patent: May 10, 2022

(54) HEAT PUMP SYSTEM FOR VEHICLE

(71) Applicants: Hyundai Motor Company, Seoul (KR); Kia Motors Corporation, Seoul (KR)

(72) Inventors: Jae Yeon Kim, Hwaseong-si (KR); Yunho Hwang, Ellicott City, MD (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 288 days.

(21) Appl. No.: 16/675,665

(22) Filed: Nov. 6, 2019

(65) Prior Publication Data

US 2021/0039474 A1 Feb. 11, 2021

(30) Foreign Application Priority Data

Aug. 7, 2019 (KR) .................. 10-2019-0095856

(51) Int. Cl.
*B60H 1/00* (2006.01)
*B60H 1/22* (2006.01)
(Continued)

(52) U.S. Cl.
CPC ..... *B60H 1/00899* (2013.01); *B60H 1/00007* (2013.01); *B60H 1/00278* (2013.01); *B60H 1/00385* (2013.01); *B60H 1/00428* (2013.01); *B60H 1/00885* (2013.01); *B60H 1/034* (2013.01); *B60H 2001/00928* (2013.01);
(Continued)

(58) Field of Classification Search
CPC .............. B60H 1/3213; B60H 1/00385; B60H 1/00907; B60H 1/22; B60H 1/2215; B60H 1/32281; B60H 1/323; B60H 2001/00928; B60H 1/3228; B60H 1/32284; B60H 1/00278; F25B 30/02; F25B 2400/23; F25B 2500/18; F25B 2500/28; F25B 2600/2513; F25B 41/39; F25B 2313/0254
See application file for complete search history.

(56) References Cited

U.S. PATENT DOCUMENTS 3,852,974 A * 12/1974 Brown ...................... F25B 7/00
62/79
6,370,903 B1 * 4/2002 Wlech ................ B60H 1/00907
62/324.6
(Continued)

FOREIGN PATENT DOCUMENTS

CN 103380339 B 1/2016
JP 5336033 B2 11/2013
(Continued)

OTHER PUBLICATIONS

Hyundai Motor Company, et al., extended "European Search Report," Application No. 19208504.1-1012; dated Jun. 10, 2020.

*Primary Examiner* — Frantz F Jules
*Assistant Examiner* — Jason N Thompson
(74) *Attorney, Agent, or Firm* — Morgan, Lewis & Bockius LLP

(57) ABSTRACT

A heat pump system for a vehicle utilizes one chiller in which a coolant and a refrigerant are heat-exchanged to adjust a temperature of a battery module, and utilizes a sub-centralized energy module with waste heat of an electrical component in a heating mode of the vehicle to improve heating efficiency.

17 Claims, 8 Drawing Sheets

(51) Int. Cl.
  *B60H 1/32* (2006.01)
  *F25B 7/00* (2006.01)
  *F25B 30/02* (2006.01)
  *F25B 41/39* (2021.01)
  *B60H 1/03* (2006.01)

(52) U.S. Cl.
  CPC .............. *B60H 2001/00942* (2013.01); *B60H 2001/00949* (2013.01); *B60H 2001/3264* (2013.01)

(56) References Cited

U.S. PATENT DOCUMENTS

| | | | |
|---|---|---|---|
| 8,215,432 B2 | 7/2012 | Nemesh et al. | |
| 8,899,062 B2 | 12/2014 | Kadle et al. | |
| 9,109,840 B2 | 8/2015 | Kadle et al. | |
| 9,239,193 B2 | 1/2016 | Kadle et al. | |
| 2006/0000228 A1* | 1/2006 | Fisher | F25B 27/00 62/239 |
| 2007/0193290 A1* | 8/2007 | Ebara | F25B 1/10 62/238.6 |
| 2012/0204596 A1* | 8/2012 | Takenaka | F25B 13/00 62/510 |
| 2013/0283838 A1 | 10/2013 | Kadle et al. | |
| 2014/0007605 A1* | 1/2014 | Schneider | F25B 30/02 62/238.7 |
| 2015/0151609 A1* | 6/2015 | Satou | F25B 5/02 165/63 |
| 2016/0185186 A1* | 6/2016 | Miyakoshi | B60H 1/3213 62/160 |
| 2019/0168570 A1* | 6/2019 | Lee | B60H 1/32 |

FOREIGN PATENT DOCUMENTS

| | | | |
|---|---|---|---|
| WO | WO 2011/056824 A2 | 5/2011 | |
| WO | WO 2012/112338 A2 | 8/2012 | |
| WO | WO 2014/022628 A1 | 2/2014 | |
| WO | WO-2018105927 A1 * | 6/2018 | ............... B60H 1/00 |

* cited by examiner

HEAT PUMP SYSTEM FOR VEHICLE

CROSS-REFERENCE TO RELATED APPLICATION

The present application claims priority to Korean Patent Application No. 10-2019-0095856 filed on Aug. 7, 2019, the entire contents of which is incorporated herein for all purposes by this reference.

BACKGROUND OF THE INVENTION

Field of the Invention

The present invention relates a heat pump system for a vehicle. More particularly, the present invention relates the heat pump system for the vehicle in which a temperature of a battery module is controlled and cooling efficiency is improved by use of one chiller in which a coolant and a refrigerant are heat-exchanged.

Description of Related Art

Generally, an air conditioning system for a vehicle includes an air conditioning device circulating a refrigerant in order to heat or cool an interior of a vehicle.

The air conditioning device, which is to maintain the interior of the vehicle at an appropriate temperature regardless of a change in an external temperature to maintain a comfortable internal environment, is configured to heat or cool the interior of the vehicle by heat exchange by an evaporator in a process in which a refrigerant discharged by driving of a compressor is circulated to the compressor through a condenser, a receiver drier, an expansion valve, and the evaporator.

That is, the air conditioner device lowers temperature and humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, as a concern about energy efficiency and environmental pollution problems has gradually increased, development of an environment-friendly vehicle configured for being substantially substituted for a vehicle having an internal combustion engine has been required, and the environment-friendly vehicles are typically classified into an electric vehicle which is typically driven using a fuel cell or electricity as a power source, and a hybrid vehicle which is driven using an engine and an electric battery.

In the electric vehicle or the hybrid vehicle among these environmentally friendly vehicles, a separate heater is not used, unlike an air conditioner of a general vehicle, and an air conditioner used in the environmentally friendly vehicle is known as a heat pump system.

Meanwhile, the electric vehicle generates driving force by converting chemical reaction energy between oxygen and hydrogen into electrical energy. In the present process, thermal energy is generated by a chemical reaction in a fuel cell. Therefore, it is necessary to secure performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor may be effectively removed in order to secure performance of the motor.

Therefore, in the hybrid vehicle or the electric vehicle according to the related art, a cooling device, a heat pump system, and a battery cooling system may be configured using separate closed circuits, respectively, to prevent heat generation in the motor, an electrical component, and the battery including the fuel cells.

Accordingly, size and weight of a cooling module mounted at the front of the vehicle are increased, and a layout of connection pipes supplying a coolant or a refrigerant to each of the heat pump system, the cooling device, and the battery cooling system in an engine compartment becomes complicated.

Furthermore, since the battery cooling system warming or cooling the battery depending in a state of the vehicle is separately provided so that the battery exhibits optimal performance, a plurality of valves for connecting the respective connection pipes to each other are used, and noise and vibration due to frequent opening or closing operations of these valves are transferred to the interior of the vehicle, such that ride comfort is deteriorated.

Furthermore, when heating the vehicle interior, there are drawbacks that the heating performance is deteriorated due to the lack of a heat source, the electricity consumption is increased by the use of the electric heater, and the power consumption of the compressor is increased.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a heat pump system for a vehicle for controlling a temperature of a battery module by use of one chiller in which a refrigerant and a coolant are heat-exchanged, and for improving heating efficiency by use of a sub-centralized energy (CE) module along with waste heat of an electrical component in a heating mode of the vehicle.

A heat pump system for a vehicle may include an air conditioning device mutually connected by a first refrigerant line circulated with a first refrigerant and including a first condenser, a first expansion valve, a first evaporator, and a first compressor; a coolant connection line mutually connecting a first portion of the first refrigerant line between the first condenser and the first evaporator and a second portion of the first refrigerant line between the first evaporator and the first compressor; a chiller provided on the coolant connection line, respectively connected to an electrical component and a battery module through a coolant line, and heat-exchanging an inflowed coolant with the first refrigerant; a sub-centralized energy (CE) module connected to the air conditioning device through the first refrigerant line and selectively heat-exchanging thermal energy generated when condensing and evaporating a second refrigerant along a second refrigerant line with the first refrigerant to adjust a temperature of the first refrigerant; and a gas injection unit provided in the air conditioning device and bypassing a part of the first refrigerant passing through the first condenser in a heating mode or a low temperature dehumidification mode of the vehicle to the first compressor to increase a flow rate of the first refrigerant circulating through the first refrigerant line.

The sub-CE module may include: a second compressor compressing the second refrigerant; a second condenser connected to the second compressor through the second refrigerant line and heat-exchanging the compressed second refrigerant supplied from the second compressor with the first refrigerant to be condensed; a second expansion valve connected to the second condenser through the second refrigerant line and configured for expanding the second refrigerant; and a second evaporator connected to the second expansion valve through the second refrigerant line, connected to the first refrigerant line, evaporating the second refrigerant supplied from the second expansion valve through heat exchange with the first refrigerant inflowed through the first refrigerant line, and supplying the evaporated second refrigerant to the second compressor.

The second condenser may be provided on the first refrigerant line between the first condenser and the first expansion valve, and the second evaporator may be provided on the first refrigerant line between the first condenser and the first expansion valve to inflow the first refrigerant passing through the second condenser.

The air conditioning device may further include a heat exchanger provided on the first refrigerant line between the first condenser and the first expansion valve, and a third expansion valve configured of controlling a movement flow of the first refrigerant inflowed to the chiller and selectively expanding the first refrigerant is provided on the coolant connection line.

The third expansion valve may expand the first refrigerant inflowed to the coolant connection line when cooling the battery module by use of the coolant heat-exchanged with the first refrigerant to be inflowed to the chiller.

A fourth expansion valve may be provided on the first refrigerant line between the second evaporator and the heat exchanger.

The heat exchanger may further condense or evaporate the refrigerant condensed in the first condenser through heat exchange with outdoor air according to a selective operation of the fourth expansion valve.

The first, third, and fourth expansion valves may each be an electric expansion valve configured of selectively expanding the refrigerant while controlling a movement flow of the refrigerant.

The gas injection unit may include: a flash tank provided on the first refrigerant line between the second condenser and the first expansion valve and dividing the first refrigerant passing through the second condenser into a gaseous refrigerant and a liquid refrigerant to be selectively exhausted; a bypass line connecting the flash tank and the first compressor and selectively supplying the first refrigerant of a gaseous state from the flash tank to the first compressor; a valve provided on the bypass line; and a fifth expansion valve provided on the first refrigerant line between the first condenser and the flash tank.

The fifth expansion valve may expand the first refrigerant passing through the first condenser in the heating mode or the low temperature dehumidification mode of the vehicle.

The gas injection unit may include: a plate-type heat exchanger provided on the first refrigerant line between the first condenser and the first expansion valve; a bypass line having one end portion connected to the first refrigerant line between the first condenser and the plate-type heat exchanger and the other end portion connected to the first compressor through the second condenser and the plate-type heat exchanger; and a fifth expansion valve provided on the bypass line at the front of the second condenser.

The second condenser may be provided on the bypass line between the first condenser and the plate-type heat exchanger, and the second evaporator may be provided on the first refrigerant line between the first condenser and the first expansion valve to inflow the first refrigerant passing through the second condenser.

The fifth expansion valve may expand the first refrigerant inflowed to the bypass line through the first condenser in the heating mode or the low temperature dehumidification mode of the vehicle.

The second compressor may be formed with a capacity smaller than a capacity of the first compressor.

The gas injection unit may be simultaneously operated with the sub-CE module in the heating mode or the low temperature dehumidification mode of the vehicle.

The first condenser may be respectively connected to a radiator and a heater through the coolant line, and heat-exchanges the coolant inflowed therein with the first refrigerant to condense the first refrigerant.

The first condenser may supply the coolant of which the temperature is increased while condensing the first refrigerant in the heating mode, the low temperature dehumidification mode, and a high temperature dehumidification mode of the vehicle to the heater through the coolant line.

The chiller may be respectively connected to the electrical component and the battery module through the coolant line, and may absorb waste heat of the electrical component while heat-exchanging the inflowed coolant with the first refrigerant or supply the coolant of a low temperature which undergoes heat transfer with the first refrigerant to the battery module.

The air conditioning device may further include an accumulator provided on the first refrigerant line between the first evaporator and the first compressor, and the coolant connection line may connect the first refrigerant line and the accumulator between the first condenser and the first expansion valve so that the refrigerant passing through the chiller inflows to the first compressor through the accumulator.

The first refrigerant and the second refrigerant may include different refrigerants.

As described above, if the heat pump system for the vehicle according to the exemplary embodiments of the present invention is applied, the chiller in which the coolant and the first refrigerant are heat-exchanged is used to control the temperature of the battery module according to the mode of the vehicle in the electric vehicle, simplifying the system.

Also, the present invention may reduce the entire refrigerant amount and improve heating efficiency and performance while minimizing electric heater use by use of the sub-CE module along with the waste heat of the electrical component in the heating mode of the vehicle.

Furthermore, the present invention may efficiently adjust the temperature of the battery module, exhibiting optimum performance of the battery module, and increase the overall travel distance of the vehicle by efficiently managing the battery module.

Furthermore, the present invention may increase the flow rate of the refrigerant by applying the gas injection unit, reducing power consumption of the first compressor and maximizing heating performance.

Furthermore, the present invention may reduce manufacturing cost and weight by simplifying the entire system and improving space utilization.

The methods and apparatuses of the present invention have other features and advantages which will be apparent

Figure 1:
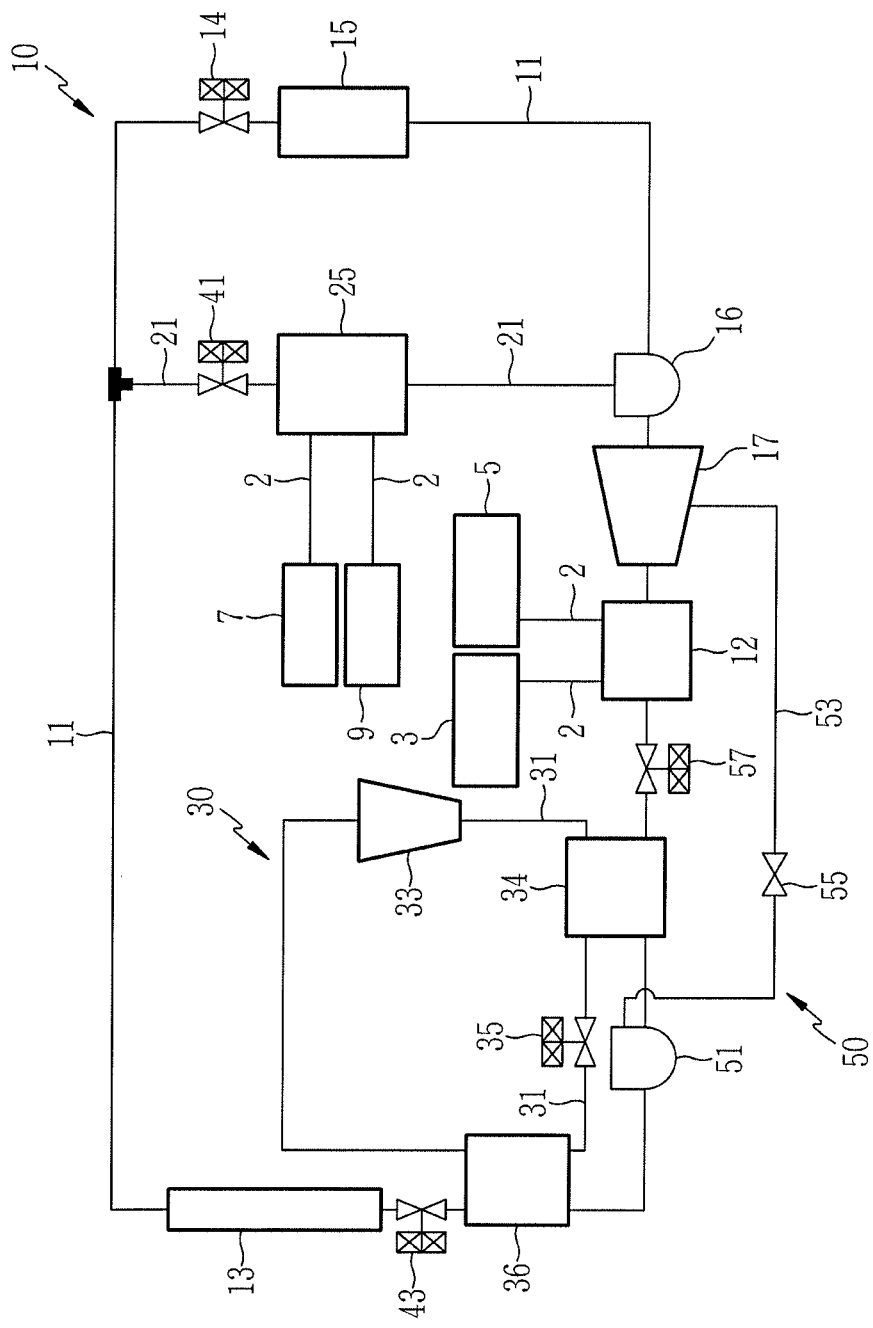
FIG. 1 is a block diagram of a heat pump system for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Exemplary embodiments described in the exemplary embodiment and configurations shown in the drawings are just the most preferable exemplary embodiments of the present invention, and do not limit the spirit and scope of the present invention. Therefore, it should be understood that there may be various equivalents and modifications capable of replacing them at the time of filing of the present application.

In order to clarify the present invention, portions that are not connected with the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout the exemplary embodiment and the claims which follow, unless explicitly described to the contrary, the word "comprise" or variations such as "comprises" or "comprising" will be understood to imply the inclusion of stated elements but not the exclusion of any other elements.

Furthermore, the terms " . . . unit", " . . . mechanism", " . . . portion", " . . . member", etc. used herein mean a unit of inclusive components performing at least one functions or operations.

FIG. 1 is a block diagram of a heat pump system for a vehicle according to an exemplary embodiment of the present invention.

The heat pump system for the vehicle according to an exemplary embodiment of the present invention may control a temperature of a battery module 9 by use of a chiller 25 in which a refrigerant and a coolant are heat-exchanged, and improve cooling efficiency by use of a sub-CE module (30: sub-centralized energy module) along with waste heat of an electrical component 7.

The electrical component 7 may include a power control apparatus, an inverter, or an on-board charger (OBC). The power control apparatus or the inverter generates may be heated while driving, and the charger may generate heat when the battery module 9 is charged.

Here, the heat pump system includes an air conditioning device 10, a coolant connection line 21, the chiller 25, the sub-CE module 30, and a gas injection unit 50, which are air conditioning devices for cooling or heating a vehicle interior in an electric vehicle.

In the exemplary embodiment of the present invention, the air conditioning device 10 may be respectively connected to a radiator 3, a heater 5, the electrical component 7, and the battery module 9 through a coolant line 2. Here, the heater 5 may be provided inside a non-illustrated HVAC module.

The air conditioning device 10 is mutually connected to a first refrigerant line 11 in which a first refrigerant is circulated, and may include a first condenser 12, a first expansion valve 14, a first evaporator 15, and a first compressor 17.

First, the first condenser 12 is connected to the first refrigerant line 11 to pass the first refrigerant, and is respectively connected to the radiator 3 and the heater 5 through the coolant line 2.

The first condenser 12 heat-exchanges the coolant inflowed from the radiator 3 or the heater 5 with the first refrigerant, condensing the first refrigerant.

Also, the first condenser 12 may supply the coolant of which the temperature is increased while condensing the first refrigerant in a heating mode, a low temperature dehumidification mode, and a high temperature dehumidification mode of the vehicle to the heater 5 through the coolant line 2.

The first condenser 12 configured as described above may be a water-cooled heat exchanger having a coolant inflowed therein.

The first expansion valve 14 selectively expands the first refrigerant passing through the first condenser 12 to be inflowed to the first evaporator 15 to control a movement flow of the first refrigerant to the first evaporator 15.

Here, the first evaporator 15 is provided inside a non-illustrated heating, ventilation, and air conditioning (HVAC) module connected to the first refrigerant line 11.

The first evaporator 15 may evaporate the first refrigerant through heat exchange with outdoor air in the cooling mode of the vehicle. The outdoor air cooled while passing through the first evaporator 15 inflows to the vehicle interior to cool the vehicle interior.

Also, the first compressor 17 is connected through the first refrigerant line 11 between the first evaporator 15 and the first condenser 12. The first compressor 17 may compress the first refrigerant of a gaseous state and supply the compressed first refrigerant to the first condenser 12.

On the other hand, a heat exchanger 13 for additionally condensing and evaporating the first refrigerant passing through the first condenser 12 may be provided in the first refrigerant line 11 between the first condenser 12 and the first expansion valve 14.

The heat exchanger 13 mutually heat-exchanges the first refrigerant mounted at the front of the vehicle and inflowed inside with the outdoor air.

Here, when condensing the first refrigerant, as the heat exchanger 13 further condenses the first refrigerant condensed in the first condenser 12, increasing sub-cooling of the first refrigerant, a coefficient of performance (COP), which is a coefficient of cooling capacity compared to required compressor power, may be improved.

In the exemplary embodiment of the present invention, the coolant connection line 21 may mutually connect the first refrigerant line 11 between the first condenser 12 and the first evaporator 15, and the first refrigerant line 11 between the first evaporator 15 and the first compressor 17.

The chiller 25 is provided on the coolant connection line 21, and is respectively connected to the electrical component 7 and the battery module 9 through the coolant line 2. The chiller 25 may heat-exchange the inflowed coolant with the first refrigerant.

Also, the chiller 25 may heat-exchange the coolant selectively inflowed from the electrical component 7 or the battery module 9 with the first refrigerant to control the temperature of the coolant. Here, the chiller 25 may be a water-cooled heat exchanger in which the coolant is inflowed therein.

That is, the chiller 25 may absorb the waste heat of the electrical component 7 while heat-exchanging the inflowed coolant inside with the first refrigerant, or supply the coolant of a low temperature which undergoes heat transfer with the first refrigerant to the battery module 9.

On the other hand, in the exemplary embodiment of the present invention, the air conditioning device 10 may further include an accumulator 16 provided in the first refrigerant line 11 between the first evaporator 15 and the first compressor 17.

On the other hand, the coolant connection line 21 may connect the first refrigerant line 11 and the accumulator 16 between the first condenser 12 and the first expansion valve 14 so that the coolant passing through the chiller 25 inflows to the first compressor 17 through the accumulator 16.

The accumulator 16 may selectively receive the first refrigerant exhausted from the first evaporator 15 or the first refrigerant passing through the chiller 25 according to the mode of the vehicle.

Here, the accumulator 16 may be mounted on the first refrigerant line 11 between the first compressor 17 and the first evaporator 15, and may be connected to the chiller 25 through the coolant connection line 21.

The accumulator 16 supplies only the coolant of the gaseous state to the first compressor 17, improving efficiency and durability of the first compressor 17.

In the exemplary embodiment of the present invention, the sub-CE module 30 is connected to the air conditioning device 10 through the first refrigerant line 11, and selectively heat-exchanges thermal energy generated during the condensing and the evaporation of the second refrigerant circulated along a second refrigerant line 31 with the first refrigerant, controlling the temperature of the first refrigerant.

The sub-CE module 30 includes a second compressor 33, a second condenser 34, a second expansion valve 35, and a second evaporator 36, which are connected by the second refrigerant line 31.

First, the second compressor 33 may compress the second refrigerant of the gaseous state and supply the compressed second refrigerant to the second condenser 34.

Here, the second compressor 33 may be formed with a capacity smaller than a capacity of the first compressor 17.

That is, the capacity of the second compressor 33 may be less than that of the first compressor 17 because the flow rate of the second refrigerant circulating through the sub-CE module 30 is less than the flow rate of the first refrigerant circulating through the air conditioning device 10.

In the exemplary embodiment of the present invention, the second condenser 34 is connected to the second compressor 33 through the second refrigerant line 31. The second condenser 34 may heat-exchange the second refrigerant which is supplied from the second compressor 33 and is compressed with the first refrigerant to be condensed.

Here, the second condenser 34 according to an exemplary embodiment of the present invention is provided on the first refrigerant line 11 between the first condenser 12 and the first expansion valve 14.

The second condenser 34 configured as described above may be the water-cooled heat exchanger in which the first and second refrigerants are respectively inflowed.

The second expansion valve 35 may selectively expand the second refrigerant passing through the second condenser 34 to be inflowed to the second evaporator 36 or to control the movement flow of the second refrigerant to the second evaporator 36.

Also, the second evaporator 36 is connected to the second expansion valve 35 through the second refrigerant line 31 and is connected to the first refrigerant line 11.

The second evaporator 36 may evaporate the refrigerant supplied from the second expansion valve 35 through heat exchange with the first refrigerant inflowed through the first refrigerant line 11 and supply the evaporated coolant to the second compressor 33.

Here, the second evaporator 36 is provided on the first refrigerant line 11 between the first condenser 12 and the first expansion valve 14 so that the first refrigerant passing through the second condenser 34 inflows.

Furthermore, the first refrigerant and the second refrigerant may be composed of different coolants.

For example the first refrigerant may be an R1234YF or an R134a refrigerant, and the second refrigerant may be an R290 coolant having an excellent refrigerant characteristic compared with the first refrigerant.

On the other hand, in the exemplary embodiment of the present invention, a third expansion valve 41 controlling the movement flow of the first refrigerant inflowed to the chiller 25 and selectively expanding the first refrigerant may be provided on the coolant connection line 21.

When cooling the battery module 9 by use of the coolant heat-exchanged with the first refrigerant, the third expansion valve 41 may expand the first refrigerant inflowed to the coolant connection line 21 to be inflowed to the chiller 25.

The battery module 26 may supply the power to the electrical component 7, and may be formed of a water-cooling type which is cooled with the coolant flowed along the coolant line 2.

Accordingly, as the coolant has a low temperature, the heat exchange is completed as the first refrigerant in the chiller 25 inflows to the battery module 26 connected through the coolant line 2, such that the battery module 26 may be efficiently cooled.

Also, a fourth expansion valve 43 may be mounted on the first refrigerant line 11 between the second evaporator 36 and the heat exchanger 13.

Accordingly, the heat exchanger 12 may additionally condense or evaporate the coolant condensed in the first condenser 12 through heat exchange with the outdoor air according to a selective operation of the fourth expansion valve 43.

Also, the gas injection unit 50 is provided in the air conditioning device 10. The gas injection unit 50 bypasses some of the first refrigerant among the first refrigerant passing through the first condenser 12 in the heating mode or the low temperature dehumidification mode of the vehicle to the first compressor 17, increasing the flow rate of the first refrigerant circulating through the first refrigerant line 11.

The gas injection unit 50 configured as described above may operate simultaneously with the sub-CE module 30 in the heating mode and the low temperature dehumidification mode of the vehicle.

In contrast, the gas injection unit 50 may be deactivated with the sub-CE module 30 in the cooling mode and the high temperature dehumidification mode of the vehicle.

Here, the gas injection unit 50 includes a flash tank 51, a bypass line 53, a valve 55, and a fifth expansion valve 57.

First, the flash tank 51 is provided on the first refrigerant line 11 between the second condenser 34 and the first expansion valve 14.

The flash tank 51 may divide the gaseous refrigerant and the liquid refrigerant among the first refrigerant in which heat exchanged is completed while passing through the first and second condensers 12 and 34 to be selectively exhausted.

The bypass line 53 connects the flash tank 51 and the first compressor 17. The bypass line 53 may selectively supply the first refrigerant of the gaseous state from the flash tank 51 to the first compressor 17.

That is, the bypass line 53 may connect the flash tank 51 and the first compressor 17 so that the gaseous refrigerant passing through the flash tank 51 selectively inflows to the first compressor 17.

In the exemplary embodiment of the present invention, the valve 55 is provided on the bypass line 53. The valve 55 may selectively open the bypass line 53 according to the mode of the vehicle.

Here, the flash tank 51 may supply the gaseous refrigerant to the first compressor 17 through the bypass line 53 which is open through operation of the valve 55. Also, the flash tank 51 may supply the liquid refrigerant to the second evaporator 36.

Furthermore, the fifth expansion valve 57 may be provided on the first refrigerant line 11 between the first condenser 12 and the flash tank 51.

In detail, the fifth expansion valve 57 is provided on the first refrigerant line 11 between the first condenser 12 and the second condenser 34.

Here, the fifth expansion valve 57 may expand the first refrigerant passing through the first condenser 12 in the heating mode and the low temperature dehumidification mode of the vehicle to be supplied to the second condenser 34.

That is, the first, third, fourth, and fifth expansion valves 14, 41, 43, and 57 may each be an electronic expansion valve that selectively expands the refrigerant while controlling the movement flow of the refrigerant, and the second expansion valve 35 may be a mechanical expansion valve.

Furthermore, the valve 55 may be a 2-way valve.

Hereinafter, the operation and action of the heat pump system for the vehicle according to an exemplary embodiment of the present invention configured as described above is described in detail with reference to FIG. 2 to FIG. 5.

First, in the heat pump system for the vehicle according to an exemplary embodiment of the present invention, the operation when cooling the battery module according to the cooling mode of the vehicle is described in detail with reference to FIG. 2.

Figure 2:
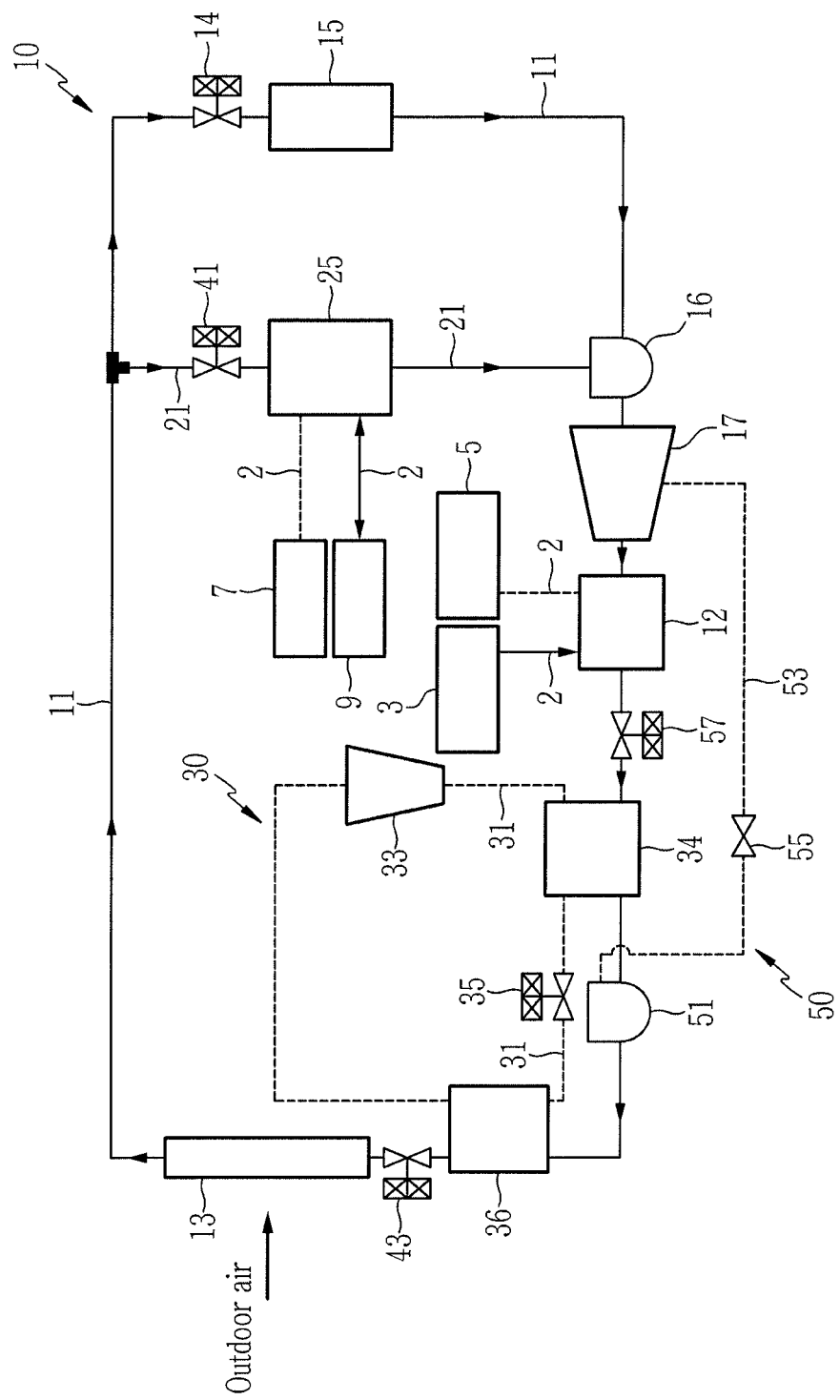
FIG. 2 is an operational state diagram according to a cooling mode in a heat pump system for a vehicle according to an exemplary embodiment of the present invention.

FIG. 2 is an operational state diagram according to a cooling mode in a heat pump system for a vehicle according to an exemplary embodiment of the present invention.

Referring to FIG. 2, in the air conditioning device 10, each of constituent elements for cooling the vehicle interior is operated. Accordingly, the first refrigerant is circulated along the first refrigerant line 11.

Here, the coolant connection line 21 is open by the operation of the third expansion valve 41.

In the first condenser 12, the coolant is circulated through the coolant line 2 in the radiator 3. Also, the coolant line 2 connected to the heater 5 is closed. That is, the coolant cooled in the radiator 3 may be supplied to the first condenser 12 through operation of a non-illustrated water pump.

Accordingly, the first condenser 12 condenses the first refrigerant supplied through the first refrigerant line 11 by use of the coolant flowing along the coolant line 2.

The refrigerant passing through the first condenser 12 inflows the heat exchanger 13 along the first refrigerant line 11. The first refrigerant inflowed into the heat exchanger 13 may be further condensed through heat exchange with the outdoor air.

The fourth expansion valve 43 may then inflow the first refrigerant into the heat exchanger 13 without expanding the first refrigerant.

The first refrigerant passing through the heat exchanger 13 is respectively supplied to the first evaporator 15 and the chiller 25 through operation of the first and third expansion valves 14 and 41.

Here, the third expansion valve 41 expands some of the first refrigerant among the first refrigerant passing through the heat exchanger 13, and opens the coolant connection line 21 so that the first refrigerant is supplied to the chiller 25.

On the other hand, the coolant is cooled by heat exchange with the first refrigerant supplied to the chiller 25. The coolant cooled in the chiller 25 is supplied to the battery module 9 connected through the coolant line 2. Accordingly, the battery module 9 is cooled by the cooled coolant.

Thus, some of the first refrigerant exhausted from the heat exchanger 13 is expanded through operation of the third expansion valve 41, enters a low temperature and low pressure state, and flows into the chiller 25 connected to the coolant connection line 21.

Next, the first refrigerant inflowed into the chiller 25 is then heat-exchanged with the coolant, passes through the accumulator 16 connected through the coolant connection line 21, and flows to the first compressor 17.

That is, the coolant of which the temperature is increased while cooling the battery module 9 is cooled through heat exchange inside the chiller 25 with the refrigerant of the low temperature and low pressure state. The cooled coolant is again supplied to the battery module 9 through the coolant line 2.

That is, the coolant may efficiently cool the battery module 9 while repeatedly performing the operation as above-described.

On the other hand, the rest of the first refrigerant exhausted from the heat exchanger 13 flows through the first refrigerant line 11 to cool the interior of the vehicle, and sequentially passes through the first expansion valve 14, the first evaporator 15, the accumulator 16, the first compressor 17, the first condenser 12, and the heat exchanger 13.

Here, the outdoor air inflowed to the HVAC module is cooled while passing through the first evaporator 15 by the refrigerant of a low temperature state inflowed to the first evaporator 15.

The cooled outdoor air directly inflows to the interior of the vehicle, cooling the vehicle interior.

On the other hand, the refrigerant of which the condensed amount is increased while sequentially passing through the first condenser 12 and the heat exchanger 13 is expanded and supplied in the first evaporator 15, evaporating the refrigerant with the lower temperature.

That is, in the exemplary embodiment of the present invention, the first condenser 12 primary condenses the first refrigerant, and the heat exchanger 13 additionally condenses the first refrigerant, which favors the sub-cooling formation of the first refrigerant.

Also, as the first refrigerant of which the sub-cooling is performed is evaporated with the lower temperature in the first evaporator 15, the temperature of the coolant which undergoes heat transfer in the first evaporator 15 may be further lowered, improving the cooling performance and the efficiency.

On the other hand, the operation of the sub-CE module 30 and the gas injection unit 50 is stopped.

That is, the first refrigerant cools the internal in the cooling mode of the vehicle while repeatedly performing the above-described processes, and may simultaneously cool the coolant through heat exchange while passing through the chiller 25.

The coolant cooled in the chiller 25 inflows to the battery module 9 while moving along the coolant line 2. Accordingly, the battery module 9 may be efficiently cooled by the coolant having a low temperature supplied to the coolant line 2.

In the exemplary embodiment of the present invention, the operation according to the heating mode of the vehicle is now described with reference to FIG. 3.

Figure 3:
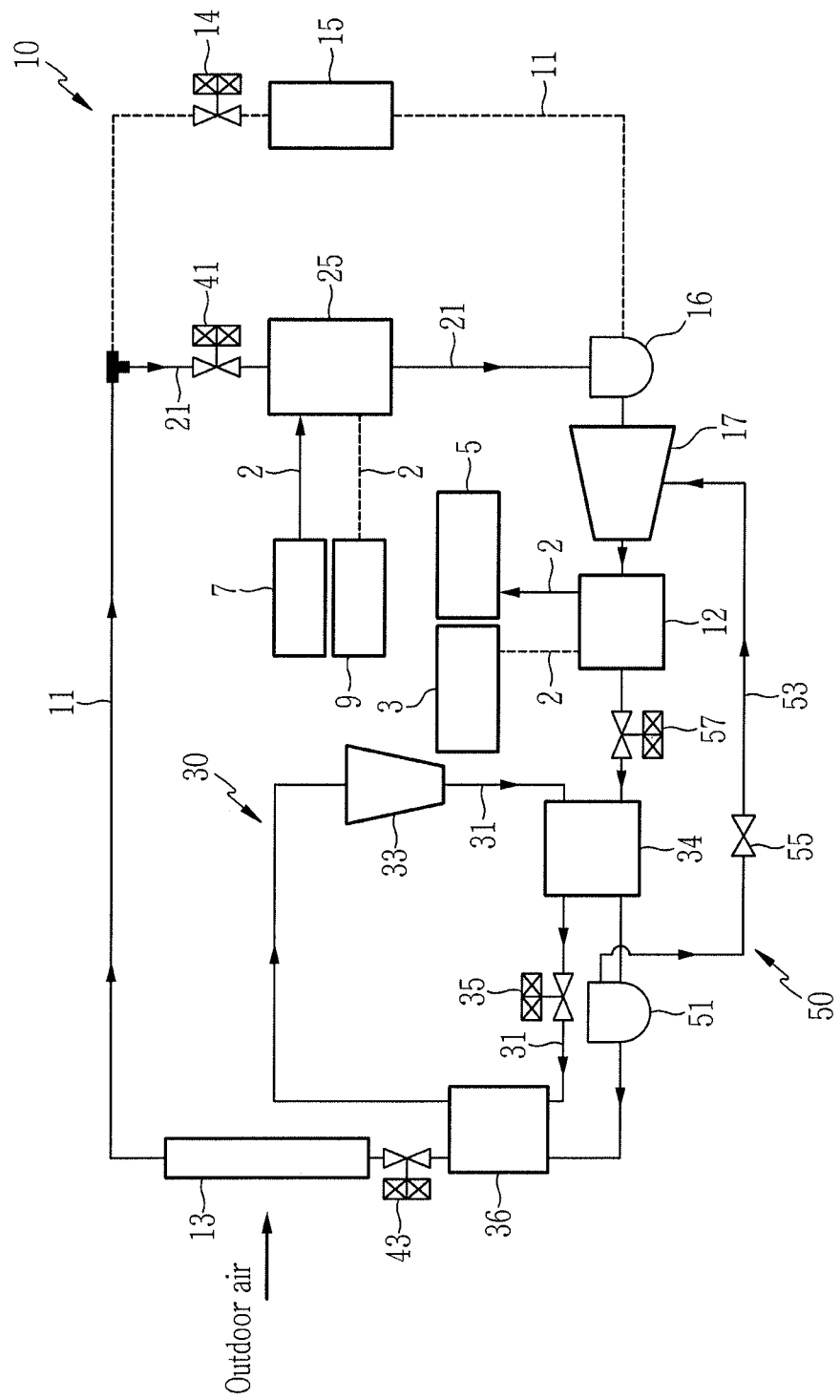
FIG. 3 is an operational state diagram according to a heating mode in a heat pump system for a vehicle according to an exemplary embodiment of the present invention.

FIG. 3 is an operational state diagram according to a heating mode in a heat pump system for a vehicle according to an exemplary embodiment of the present invention.

Referring to FIG. 3, when the waste heat of the electrical component 7 is sufficient, the heat pump system may recover the waste heat of the electrical component 7 to be used for the internal heating.

First, in the air conditioning device 10, the first refrigerant is circuited along the first refrigerant line 11 by operating each of the constituent elements to heat the vehicle interior.

Here, the first refrigerant line 11 connecting the first condenser 12 and the first evaporator 15 is closed through operation of the first expansion valve 14. Also, the coolant connection line 21 connected to the chiller 25 is open through operation of the third expansion valve 41.

In the instant case, the third expansion valve 41 may expand the refrigerant to be supplied to the chiller 25.

Accordingly, the chiller 25 evaporates the first refrigerant by use of the coolant flowed along the coolant line 2 and having an elevated temperature while recovering the waste heat of the electrical component 7.

That is, as the coolant inflowed to the chiller 25 sufficiently absorbs the waste heat from the electrical component 7 to be inflowed in a high temperature state, the chiller 25 may increase the evaporation amount of the first refrigerant.

Next, the first refrigerant passing through the chiller 25 is supplied to the accumulator 16 along the open coolant connection line 21.

The first refrigerant supplied to the accumulator 16 is separated into gas and liquid. Among the first refrigerant separated into gas and liquid, the gaseous refrigerant is supplied to the first compressor 17.

The first refrigerant, compressed by the first compressor 17 with a high temperature and a high pressure flows into the first condenser 12.

Here, the first condenser 12 heat-exchanges the coolant supplied through the coolant line 2 connected to the heater 5 with the first refrigerant of the high temperature and the high pressure supplied from the first compressor 17.

The coolant of which temperature is increased by heat exchange with the first refrigerant may be supplied to the heater 5 connected through the coolant line 2. Here, the coolant line 2 connected to the radiator 3 is closed.

Accordingly, the coolant of which the temperature is increased while passing through the first condenser 12 is supplied to the heater 5 through operation of the non-illustrated water pump.

That is, the outdoor air inflowed from the outside is inflowed with the uncooled room temperature state when passing through the first evaporator 15 where the first refrigerant is not supplied. The inflowed outdoor air is converted into the high temperature state while passing through the heater 5 and is inflowed into the vehicle interior, realizing the heating of the vehicle interior.

On the other hand, the first condenser 12 condenses the first refrigerant supplied through the first refrigerant line 11 by use of the coolant supplied to the coolant line 2 connected to the heater 5.

The refrigerant passing through the first condenser 12 is inflowed to the heat exchanger 13 along the first refrigerant line 11. The first refrigerant inflowed into the heat exchanger 13 may be further condensed through heat exchange with the outdoor air.

Here, the fourth expansion valve 43 may inflow the first refrigerant into the heat exchanger 13 without expanding the first refrigerant.

The first refrigerant passing through the heat exchanger 13 is supplied to the chiller 25 along the coolant connection line 21 which is open through operation of the third expansion valve 41.

That is, the first refrigerant passed through the heat exchanger 13 flows through the first refrigerant line 11 to heat the interior of the vehicle, and sequentially passes through the accumulator 16, the first compressor 17, the first condenser 12, and the heat exchanger 13.

On the other hand, in the sub-CE module 30, each of the constituent elements is operated to circulate the second refrigerant along the second refrigerant line 31. Furthermore, each of the constituent elements may be operated in the gas injection unit 50.

Accordingly, the first refrigerant, which has passed through the first condenser 12, is inflowed to the second condenser 34 in the expanded state through operation of the fifth expansion valve 57.

Thus, the second condenser 34 heat-exchanges the second refrigerant supplied from the second compressor 33 through the second refrigerant line 31 by heat exchange with the first refrigerant which is expanded while passing through the fifth expansion valve 57 from the first condenser 12 to condense the second refrigerant.

The second refrigerant passing through the second condenser 34 expands through operation of the second expansion valve 35 and inflows to the second evaporator 36. Next, the second refrigerant is evaporated through heat exchange with the first refrigerant passing through the flash tank 51 in the second evaporator 36, and is supplied to the second compressor 33 through the second refrigerant line 31.

On the other hand, the first refrigerant passing through the second condenser 34 is divided into gas and liquid in the flash tank 51 of the first refrigerant separated into gas and liquid, the gaseous refrigerant is supplied to the first compressor 17 through the bypass line 53 which is open.

That is, the gas injection unit 50 again inflows the gaseous refrigerant to the first compressor 17 through the bypass line 53 among the first refrigerant condensed while respectively passing through the first and second condensers 12 and 34, increasing the flow rate of the first refrigerant circulating through the first refrigerant line 11.

Also, among the first refrigerant separated into gas and liquid in the flash tank 51, the liquid refrigerant is further condensed while passing through the second evaporator 36. Next, the first refrigerant passing through the second evaporator 36 inflows to the heat exchanger 13 along the first refrigerant line 11 which is open through operation of the fourth expansion valve 43.

That is, in the exemplary embodiment of the present invention, the first condenser 12 primary condenses the first refrigerant, and may further condense or evaporate the first refrigerant in the second condenser 34 and the second evaporator 36 by use of the second refrigerant circulating through the sub-CE module 30.

The first refrigerant may then be further condensed through heat exchange with the outdoor air in the heat exchanger 13, increasing the condensation amount of the first refrigerant.

The first refrigerant with the increased condensation amount may smoothly recover the waste heat from the coolant supplied from the electrical component 7 in the chiller 25, improving the heating performance and the efficiency.

That is, the heat pump system according to the exemplary embodiment of the present invention utilizes thermal energy generated by the phase change of the second refrigerant in the sub-CE module 30 together with the waste heat of the electrical component 7 in the heating mode of the vehicle, improving the heating efficiency and performance while minimizing the use amount of a separate electric heater.

Furthermore, the gas injection unit 50 increases the flow rate of the first refrigerant, reducing the power consumption of the first compressor 17 and maximizing heating performance.

The operation according to the low temperature dehumidification mode of the vehicle in the exemplary embodiment of the present invention is now described with reference to FIG. 4.

Figure 4:
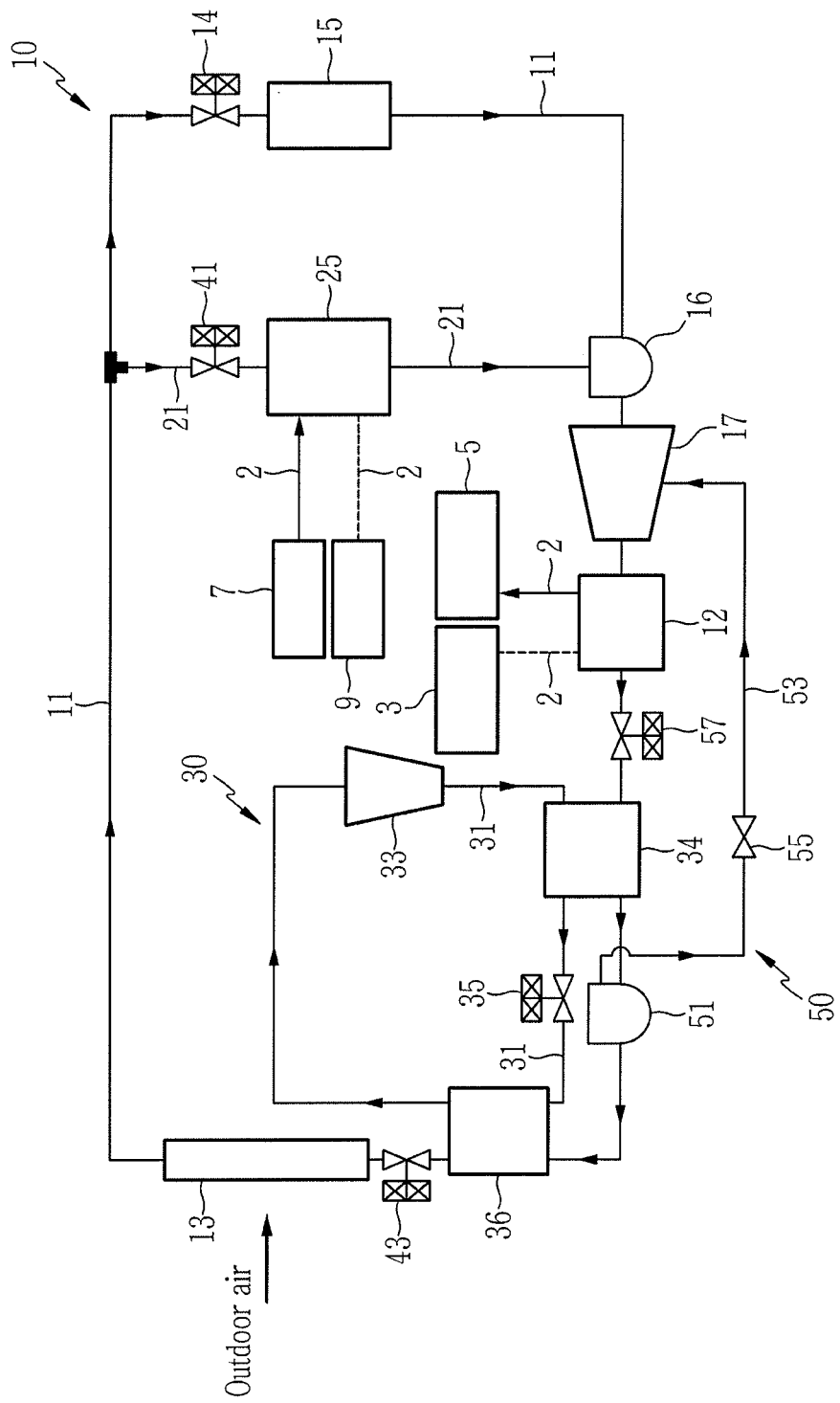
FIG. 4 is an operational state diagram according to a low temperature dehumidification mode in a heat pump system for a vehicle according to an exemplary embodiment of the present invention.

FIG. 4 is an operational state diagram according to a low temperature dehumidification mode in a heat pump system for a vehicle according to an exemplary embodiment of the present invention.

Here, the low temperature dehumidification mode is a mode that operates when dehumidification is required in the vehicle interior in the heating mode of the vehicle.

Referring to FIG. 4, when the waste heat of the electrical component 7 is sufficient, the heat pump system may receive the waste heat of the electrical component 7 to be used for internal heating.

First, in the air conditioning device 10, each constituent element is operated to heat the vehicle interior, so that the first refrigerant is circulated along the first refrigerant line 11.

Here, the coolant connection line 21, which is connected to the chiller 25, is open through operation of the third expansion valve 41. The third expansion valve 41 may expand the refrigerant to be supplied to the chiller 25.

That is, among the first refrigerant passing through the heat exchanger 13, some of the first refrigerant may be expanded while passing through the third expansion valve 41 and then supplied to the chiller 25.

Accordingly, the chiller 25 evaporates the first refrigerant by use of the coolant that flows along the coolant line 2 and having an elevated temperature while recovering the waste heat of the electrical component 7.

That is, as the coolant inflowed to the chiller 25 sufficiently absorbs the waste heat from the electrical component 7 and flows with a high temperature, the chiller 25 may increase the evaporation amount of the first refrigerant.

Then, the first refrigerant passing through the chiller 25 is supplied to the accumulator 16 along the open coolant connection line 21.

Meanwhile, the first refrigerant line 11, which connects the first condenser 12 and the first evaporator 15, is open through operation of the first expansion valve 14 to dehumidify the interior of the vehicle.

Accordingly, the remaining first refrigerant exhausted from the heat exchanger 13 may be supplied to the first evaporator 15 in the expanded state through operation of the first expansion valve 14 to dehumidify the interior of the vehicle.

The first refrigerant supplied to the accumulator 16 is separated into gas and liquid. Among the first refrigerants separated into gas and liquid, the gaseous refrigerant is supplied to the first compressor 17.

The first refrigerant, compressed from the first compressor 17 to a high temperature and a high pressure, flows into the first condenser 12.

Here, the first condenser 12 heat-exchanges the coolant supplied through the coolant line 2 connected to the heater 5 with the first refrigerant of a high temperature and a high pressure supplied from the first compressor 17.

The coolant of which the temperature is increased by heat exchange with the first refrigerant may be supplied to the heater 5 connected through the coolant line 2. Here, the coolant line 2 connected to the radiator 3 is closed.

Thus, the heater 5 is supplied with the coolant having the temperature which is increased while passing through the first condenser 12 through operation of a non-illustrated water pump.

On the other hand, the first condenser 12 condenses the first refrigerant supplied through the first refrigerant line 11 by use of the coolant supplied to the coolant line 2 connected to the heater 5.

The refrigerant passing through the first condenser 12 flows into the heat exchanger 13 along the first refrigerant line 11. The first refrigerant inflowed into the heat exchanger 13 may be further condensed through heat exchange with the outdoor air.

Here, the fourth expansion valve 43 may then inflow the first refrigerant into the heat exchanger 13 without expanding the first refrigerant.

The first refrigerant passing through the heat exchanger 13 is supplied to the first evaporator 15 and the chiller 25 along the first refrigerant line 11 and the coolant connection line 21 that are open through operation of the first and third expansion valves 14 and 41, respectively.

That is, the first refrigerant having passed through the heat exchanger 13 flows along the first refrigerant line 11 and the coolant connection line 21 to heat the vehicle's interior, and sequentially passes through the chiller 25, the first evaporator 15, the accumulator 16, the first compressor 17, the first condenser 12, and the heat exchanger 13.

On the other hand, in the sub-CE module 30, each constituent element is operated to circulate the second refrigerant along the second refrigerant line 31. Furthermore, in the gas injection unit 50, each constituent element may operate.

Accordingly, the first refrigerant having passed through the first condenser 12 is inflowed to the second condenser 34 in the expanded state through operation of the fifth expansion valve 57.

Thus, the second condenser 34 heat-exchanges the second refrigerant supplied from the second compressor 33 through the second refrigerant line 31 by heat exchange with the first refrigerant which is expanded while passing through the fifth expansion valve 57 from the first condenser 12 to condense the second refrigerant.

The second refrigerant passing through the second condenser 34 expands through operation of the second expansion valve 35 and inflows to the second evaporator 36. Next, the second refrigerant is evaporated through heat exchange with the first refrigerant passing through the flash tank 51 in the second evaporator 36, and is supplied to the second compressor 33 through the second refrigerant line 31.

On the other hand, the first refrigerant passing through the second condenser 34 is divided into gas and liquid in the flash tank 51. Among the first refrigerant separated into gas and liquid, the gaseous refrigerant is supplied to the first compressor 17 through the bypass line 53 which is open.

That is, the gas injection unit 50 again inflows the gaseous refrigerant to the first compressor 17 through the bypass line 53 among the first refrigerant condensed while respectively passing through the first and second condensers 12 and 34, increasing the flow rate of the first refrigerant circulating through the first refrigerant line 11.

Also, among the first refrigerant separated into gas and liquid in the flash tank 51, the liquid refrigerant is further condensed while passing through the second evaporator 36. Next, the first refrigerant passing through the second evaporator 36 inflows to the heat exchanger 13 along the first refrigerant line 11 which is open through operation of the fourth expansion valve 43.

That is, in the exemplary embodiment of the present invention, the first condenser 12 primary condenses the first refrigerant, and may further condense or evaporate the first refrigerant in the second condenser 34 and the second evaporator 36 by use of the second refrigerant circulating through the sub-CE module 30.

The first refrigerant may then be further condensed through heat exchange with the outdoor air in the heat exchanger 13, increasing the condensation amount of the first refrigerant.

The first refrigerant with the increased condensation amount may smoothly recover the waste heat from the coolant supplied from the electrical component 7 in the chiller 25, improving the heating performance and the efficiency.

Accordingly, the outdoor air inflowed from the outside is dehumidified as it passes through the first evaporator 15 supplied with the first refrigerant.

The outdoor air dehumidified while passing through the first evaporator 15 is converted to a high temperature state while passing through the heater 5 and inflows into the vehicle interior, heating and dehumidifying the vehicle interior.

As described above, the heat pump system according to the exemplary embodiment of the present invention utilizes thermal energy generated by the phase change of the second refrigerant in the sub-CE module 30 together with the waste heat of the electrical component 7 in the low temperature dehumidification mode, improving the heating efficiency and performance while minimizing the use amount of a separate electric heater.

Furthermore, the gas injection unit 50 increases the flow rate of the first refrigerant, reducing the power consumption of the first compressor 17 and maximizing heating performance, and the internal dehumidification may be performed together therewith by selectively supplying the first refrigerant which is expanded by the first evaporator 15.

In the exemplary embodiment of the present invention, the operation according to the high temperature dehumidification mode of the vehicle is described with reference to FIG. 5.

Figure 5:
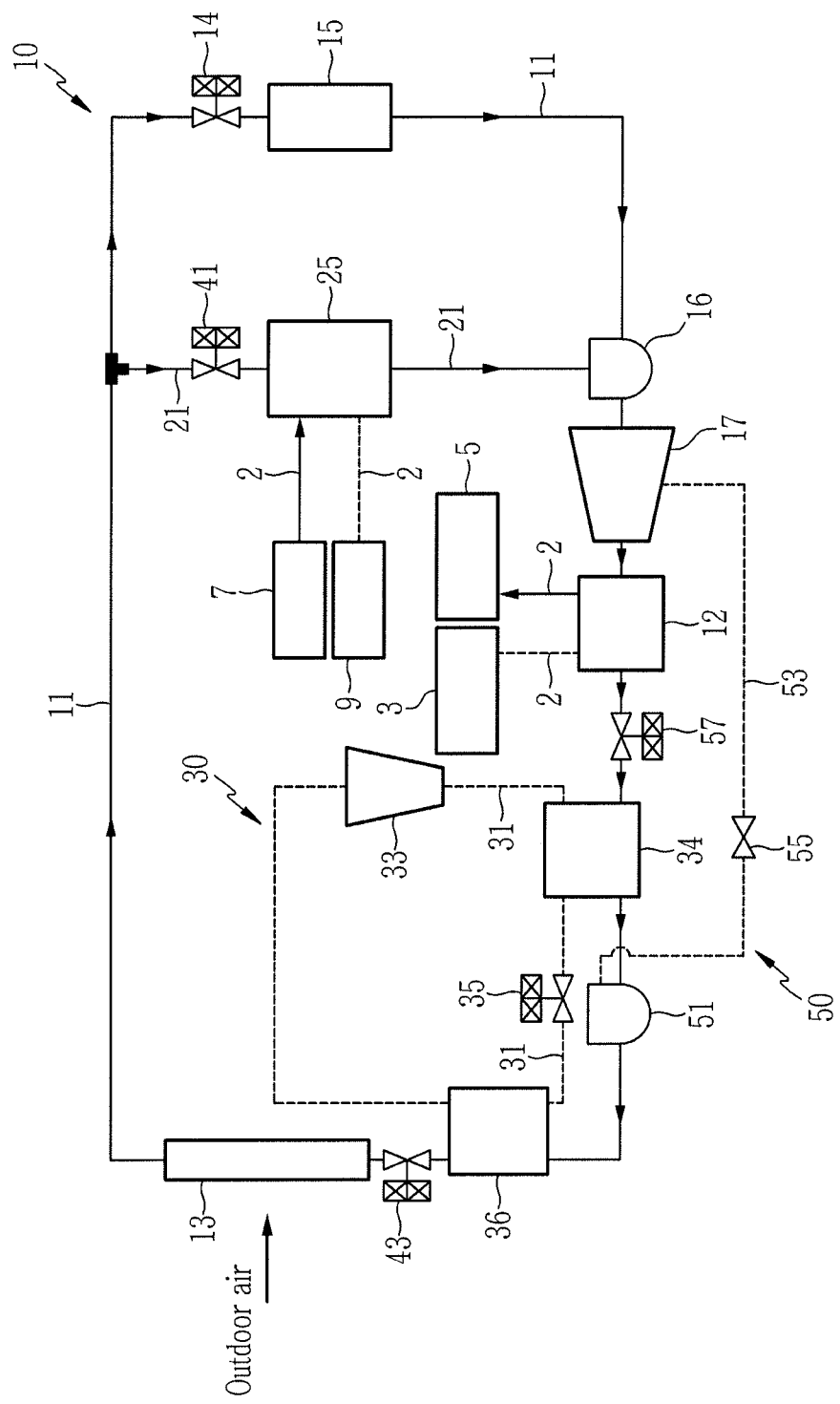
FIG. 5 is an operational state diagram according to a high temperature dehumidification mode in a heat pump system for a vehicle according to an exemplary embodiment of the present invention.

FIG. 5 is an operational state diagram according to a high temperature dehumidification mode in a heat pump system for a vehicle according to an exemplary embodiment of the present invention.

Here, the high temperature dehumidification mode is a mode in which the dehumidification is performed in the vehicle interior in the cooling mode of the vehicle.

Referring to FIG. 5, in the air conditioning device 10, each constituent element is operated to cool the vehicle interior. Accordingly, the first refrigerant is circulated along the first refrigerant line 11.

Here, the coolant connection line 21 is open by the operation of the third expansion valve 41.

In the first condenser 12, the coolant is circulated through the coolant line 2 in the radiator 3. Also, the coolant line 2 connected to the heater 5 is open.

That is, the coolant cooled in the radiator 3 may be supplied to the first condenser 12 through operation of a non-illustrated water pump.

Accordingly, the first condenser 12 condenses the first refrigerant supplied through the first refrigerant line 11 by use of the coolant flowing along the coolant line 2.

The coolant of which the temperature has risen while condensing the first refrigerant may be supplied to the heater 5 through the coolant line 2 connected to the heater 5.

Meanwhile, the refrigerant passing through the first condenser 12 is inflowed to the heat exchanger 13 along the first refrigerant line 11. The first refrigerant inflowed into the heat exchanger 13 may be further condensed through heat exchange with the outdoor air.

The fourth expansion valve 43 may then inflow the first refrigerant into the heat exchanger 13 without expanding the first refrigerant.

The first refrigerant passing through the heat exchanger 13 is respectively supplied to the first evaporator 15 and the chiller 25 through operation of the first and third expansion valves 14 and 41.

Here, the third expansion valve 41 expands some of the first refrigerant passing through the heat exchanger 13, and opens the coolant connection line 21 so that the expanded first refrigerant is supplied to the chiller 25.

On the other hand, although not shown in FIG. 5, the coolant line 2 connected to the battery module 9 may be selectively open when the cooling of the battery module 9 is required.

Accordingly, the coolant may be cooled by heat exchange with the first refrigerant supplied to the chiller 25, and then supplied to the battery module 9 again through the coolant line 2 connected to the battery module 9. Accordingly, the battery module 9 is cooled by the cooled coolant.

That is, a portion of the first refrigerant exhausted from the heat exchanger 13 is expanded through operation of the third expansion valve 41 to enter a low temperature and low pressure state, and flows into the chiller 25 connected to the coolant connection line 21.

Then, the first refrigerant inflowed to the chiller 25 is selectively heat-exchanged with the coolant and flows to the first compressor 17 through the accumulator 16 connected to the coolant connection line 21.

Meanwhile, the remaining first refrigerant exhausted from the heat exchanger 13 flows through the first refrigerant line 11 to cool the vehicle interior, and sequentially passes through the first expansion valve 14, the first evaporator 15, the accumulator 16, the first compressor 17, the first condenser 12, and the heat exchanger 13.

Here, the outdoor air inflowed to the HVAC module is cooled while passing through the first evaporator 15 by the refrigerant of a low temperature state inflowed to the first evaporator 15.

The outdoor air cooled while passing through the first evaporator 15 is dehumidified while passing through the heater 5 supplied with a high temperature coolant from the first condenser 12 and flowed into the vehicle interior, cooling and dehumidifying the vehicle interior.

On the other hand, in the first evaporator 15, the refrigerant of which the condensed amount is increased while sequentially passing through the first condenser 12 and the heat exchanger 13 is expanded and supplied, evaporating the refrigerant with a lower temperature.

That is, in the exemplary embodiment of the present invention, the first condenser 12 primary condenses the first refrigerant and the heat exchanger 13 additionally condenses the first refrigerant, which favors the sub-cooling formation of the first refrigerant.

Also, as the first refrigerant of which the sub-cooling is performed is evaporated with the lower temperature in the first evaporator 15, the temperature of the coolant which undergoes heat transfer in the first evaporator 15 may be further lowered, improving the cooling performance and the efficiency.

On the other hand, the operation of the sub-CE module 30 and the gas injection unit 50 is stopped.

That is, the high temperature dehumidification mode of the vehicle cools the interior of the vehicle by use of the first refrigerant while repeatedly performing the above-described processes, and simultaneously supplies the coolant having the increased temperature through heat exchange with the first refrigerant in the first condenser 12 to the heater 5, performing the internal dehumidification together therewith.

On the other hand, the heat pump system for the vehicle according to various exemplary embodiments of the present invention is described with reference to FIG. 6.

Figure 6:
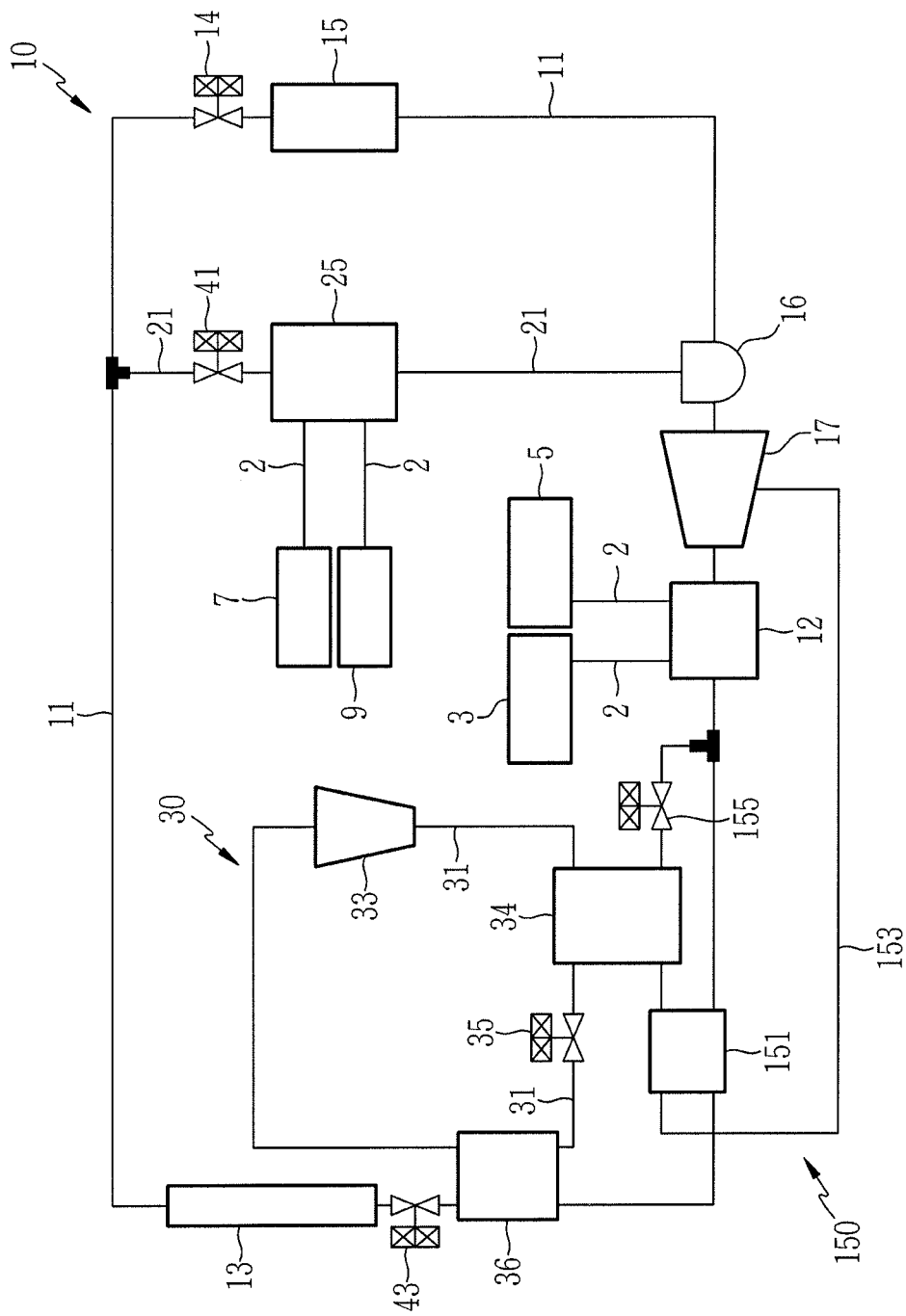
FIG. 6 is a block diagram of a heat pump system for a vehicle according to various exemplary embodiments of the present invention.

FIG. 6 is a block diagram of a heat pump system for a vehicle according to various exemplary embodiments of the present invention.

Referring to FIG. 6, the heat pump system for the vehicle according to various exemplary embodiments of the present invention may control a temperature of a battery module 9 by use of a chiller 25 in which a refrigerant and a coolant are heat-exchanged, and improve cooling efficiency by use of a sub-CE module (30: sub-centralized energy module) along with waste heat of an electrical component 7.

The electrical component 7 may include a power control apparatus, an inverter, or an on-board charger (OBC). The power control apparatus or the inverter generates heat while driving, and the charger may generate heat when the battery module 9 is charged.

Here, the heat pump system includes an air conditioning device 10, a coolant connection line 21, the chiller 25, a sub-CE module 30, and a gas injection unit 150, which are air conditioning devices for cooling or heating a vehicle interior in an electric vehicle.

In another exemplary embodiment of the present invention, the air conditioning device 10 may be respectively connected to the radiator 3, the heater 5, the electrical component 7, and the battery module 9 through the coolant line 2. Here, the heater 5 may be provided inside the non-illustrated HVAC module.

The air conditioning device 10 is mutually connected to a first refrigerant line 11 in which a first refrigerant is circulated, and may include a first condenser 12, a first expansion valve 14, a first evaporator 15, and a first compressor 17.

First, the first condenser 12 is connected to the refrigerant line 51 to pass the first refrigerant, and is respectively connected to the radiator 3 and the heater 5 through the coolant line 2.

The first condenser 12 heat-exchanges the coolant inflowed from the radiator 3 or the heater 5 with the first refrigerant, condensing the first refrigerant.

Also, the first condenser 12 may supply the coolant of which the temperature is increased while condensing the first refrigerant in a heating mode, a low temperature dehumidification mode, and a high temperature dehumidification mode of the vehicle to the heater 5 through the coolant line 2.

The first condenser 12 configured as described above may be a water-cooled heat exchanger having a coolant inflowed therein.

The first expansion valve 14 selectively expands the first refrigerant passing through the first condenser 12 to be inflowed to the first evaporator 15 to control a movement flow of the first refrigerant to the first evaporator 15.

Here, the first evaporator 15 is provided inside a non-illustrated heating, ventilation, and air conditioning (HVAC) module connected to the first refrigerant line 11.

The first evaporator 15 may evaporate the first refrigerant through heat exchange with outdoor air in the cooling mode of the vehicle. The outdoor air cooled while passing through the first evaporator 15 inflows to the vehicle interior to cool the vehicle interior.

Also, the first compressor 17 is connected through the first refrigerant line 11 between the first evaporator 15 and the first condenser 12. The first compressor 17 may compress the first refrigerant of a gaseous state and supply the compressed first refrigerant to the first condenser 12.

On the other hand, a heat exchanger 13 for additionally condensing and evaporating the first refrigerant passing through the first condenser 12 may be provided in the first refrigerant line 11 between the first condenser 12 and the first expansion valve 14.

The heat exchanger 13 mutually heat-exchanges the first refrigerant disposed at the front of the vehicle and inflowed inside with the outdoor air.

Here, when condensing the first refrigerant, as the heat exchanger 13 further condenses the first refrigerant condensed in the first condenser 12, increasing sub-cooling of the first refrigerant, a coefficient of performance (COP), which is a coefficient of cooling capacity compared to required compressor power, may be improved.

In another exemplary embodiment of the present invention, the coolant connection line 21 may mutually connect the first refrigerant line 11 between the first condenser 12 and the first evaporator 15, and the first refrigerant line 11 between the first evaporator 15 and the first compressor 17.

The chiller 25 is provided on the coolant connection line 21, and is respectively connected to the electrical component 7 and the battery module 9 through the coolant line 22. The chiller 25 may heat-exchange the inflowed coolant with the first refrigerant.

Also, the chiller 25 may heat-exchange the coolant selectively inflowed from the electrical component 7 or the battery module 9 with the first refrigerant to control the temperature of the coolant. Here, the chiller 25 may be the water-cooled heat exchanger in which the coolant is inflowed therein.

That is, the chiller 25 may absorb the waste heat of the electrical component 7 while heat-exchanging the inflowed coolant with the first refrigerant, or supply the coolant of the low temperature, which undergoes heat transfer with the first refrigerant, to the battery module 9.

On the other hand, in another exemplary embodiment of the present invention, the air conditioning device 10 may further include an accumulator 16 provided in the first refrigerant line 11 between the first evaporator 15 and the first compressor 17.

Furthermore, the coolant connection line 21 may connect the first refrigerant line 11 and the accumulator 16 between the first condenser 12 and the first expansion valve 14 so that the coolant passing through the chiller 25 inflows to the first compressor 17 through the accumulator 16.

The accumulator 16 may selectively receive the first refrigerant exhausted from the first evaporator 15 or the first refrigerant passing through the chiller 25 according to the mode of the vehicle.

Here, the accumulator 16 may be mounted on the first refrigerant line 11 between the first compressor 17 and the first evaporator 15, and may be connected to the chiller 25 through the coolant connection line 21.

The accumulator 16 supplies only the coolant of the gaseous state to the first compressor 17, improving efficiency and durability of the first compressor 17.

In the exemplary embodiment of the present invention, the sub-CE module 30 is connected to the air conditioning device 10 through the first refrigerant line 11, and selectively heat-exchanges thermal energy generated during the condensing and the evaporation of the second refrigerant circulated along the second refrigerant line 31 with the first refrigerant, controlling the temperature of the first refrigerant.

The sub-CE module 30 includes a second compressor 33, a second condenser 34, a second expansion valve 35, and a second evaporator 36, which are connected by the second refrigerant line 31.

First, the second compressor 33 may compress the second refrigerant of the gaseous state and supply the compressed second refrigerant to the second condenser 34.

Here, the second compressor 33 may be formed with a capacity smaller than a capacity of the first compressor 17.

That is, the capacity of the second compressor 33 may be less than that of the first compressor 17 because the flow rate of the second refrigerant circulating through the sub-CE module 30 is less than the flow rate of the first refrigerant circulating through the air conditioning device 10.

In the exemplary embodiment of the present invention, the second condenser 34 is connected to the second compressor 33 through the second refrigerant line 31. The second condenser 34 may heat-exchange the second refrigerant which is supplied from the second compressor 33 and is compressed with the first refrigerant to be condensed.

Here, the second condenser 34 according to various exemplary embodiments of the present invention may be supplied with the first refrigerant through the gas injection unit 150.

The second condenser 34 configured as described above may be the water-cooled heat exchanger in which the first and second refrigerants are respectively inflowed.

The second expansion valve 35 may selectively expand the second refrigerant passing through the second condenser 34 to be inflowed to the second evaporator 36 or control the movement flow of the second refrigerant to the second evaporator 36.

Also, the second evaporator 36 is connected to the second expansion valve 35 through the second refrigerant line 31, and is connected to the first refrigerant line 11.

The second evaporator 36 may evaporate the refrigerant supplied from the second expansion valve 35 through heat exchange with the first refrigerant inflowed through the first refrigerant line 11, and supply the evaporated coolant to the second compressor 33.

Here, the second evaporator 36 is provided on the first refrigerant line 11 between the first condenser 12 and the first expansion valve 14 so that the first refrigerant passing through the second condenser 34 inflows.

Furthermore, the first refrigerant and the second refrigerant may include different coolants.

For example the first refrigerant may be an R1234YF or an R134a refrigerant, and the second refrigerant may be an R290 coolant having an excellent refrigerant characteristic compared with the first refrigerant.

On the other hand, in the exemplary embodiment of the present invention, a third expansion valve 41 controlling the movement flow of the first refrigerant inflowed to the chiller 25 and selectively expanding the first refrigerant may be provided on the coolant connection line 21.

When cooling the battery module 9 by use of the coolant heat-exchanged with the first refrigerant, the third expansion valve 41 may expand the first refrigerant inflowed to the coolant connection line 21 to be inflowed to the chiller 25.

The battery module 26 may supply the power to the electrical component 7, and may be formed of a water-cooling type which is cooled with the coolant flowed along the coolant line 2.

Accordingly, as the coolant has a low temperature, the heat exchange is completed as the first refrigerant in the chiller 25 inflows to the battery module 26 connected through the coolant line 2, such that the battery module 26 may be efficiently cooled.

Also, a fourth expansion valve 43 may be mounted on the first refrigerant line 11 between the second evaporator 36 and the heat exchanger 13.

Accordingly, the heat exchanger 12 may additionally condense or evaporate the coolant condensed in the first condenser 12 through heat exchange with the outdoor air according to a selective operation of the fourth expansion valve 43.

Also, the gas injection unit 150 is provided in the air conditioning device 10. The gas injection unit 50 bypasses some of the refrigerant among the refrigerant passing through the first condenser 12 in the heating mode or the low temperature dehumidification mode of the vehicle to the first compressor 17, increasing the flow rate of the first refrigerant circulating through the first refrigerant line 11.

The gas injection unit 150 configured as described above may operate simultaneously with the sub-CE module 30 in the heating mode and the low temperature dehumidification mode of the vehicle.

In contrast, the gas injection unit 150 may be deactivated with the sub-CE module 30 in the cooling mode and high temperature dehumidification mode of the vehicle.

Here, the gas injection unit 150 may include a plate-type heat exchanger 151, a bypass line 153, and a fifth expansion valve 155.

First, the plate-type heat exchanger 151 may be provided on the first refrigerant line 151 between the first condenser 12 and the first expansion valve 15.

One end portion of the bypass line 153 is connected to the first refrigerant line 11 between the first condenser 12 and the plate-type heat exchanger 151. The other end portion of the bypass line 153 may be connected to the first compressor 17 through the second condenser 34 and the plate-type heat exchanger 151.

Here, the second condenser 34 may be provided on the bypass line 153 between the first condenser 12 and the plate-type heat exchanger 151.

That is, part of the first refrigerant passing through the first condenser 12 may inflow to the bypass line 153 and the remainder of the first refrigerant may inflow to the plate-type heat exchanger 151 through the first refrigerant line 11.

Also, the fifth expansion valve 155 may be provided on the bypass line 153 at the front of the second condenser 34.

The fifth expansion valve 155 may expand the first refrigerant inflowed to the bypass line 153 through the first condenser 12 in the heating mode and the low temperature dehumidification mode of the vehicle to be supplied to the second condenser 34.

Accordingly, the plate-type heat exchanger 151 may mutually heat-exchange the first refrigerant which is introduced into the bypass line 153 and expanded through operation of the fifth expansion valve 155 to pass through the second condenser 34 and the first refrigerant discharged from the first condenser 12.

That is, the bypass line 153 may selectively supply the first compressor of the gaseous state to the first compressor 17 among the first refrigerant which undergoes heat transfer while passing through the second condenser 34 and the plate-type heat exchanger 151.

Hereinafter, the operation and actions of the heat pump system for the vehicle according to various exemplary embodiments of the present invention configured as described above is described with reference to FIG. 7 and FIG. 8.

First, in another exemplary embodiment of the present invention, the operation according to the heating mode of the vehicle is described with reference to FIG. 7.

Figure 7:
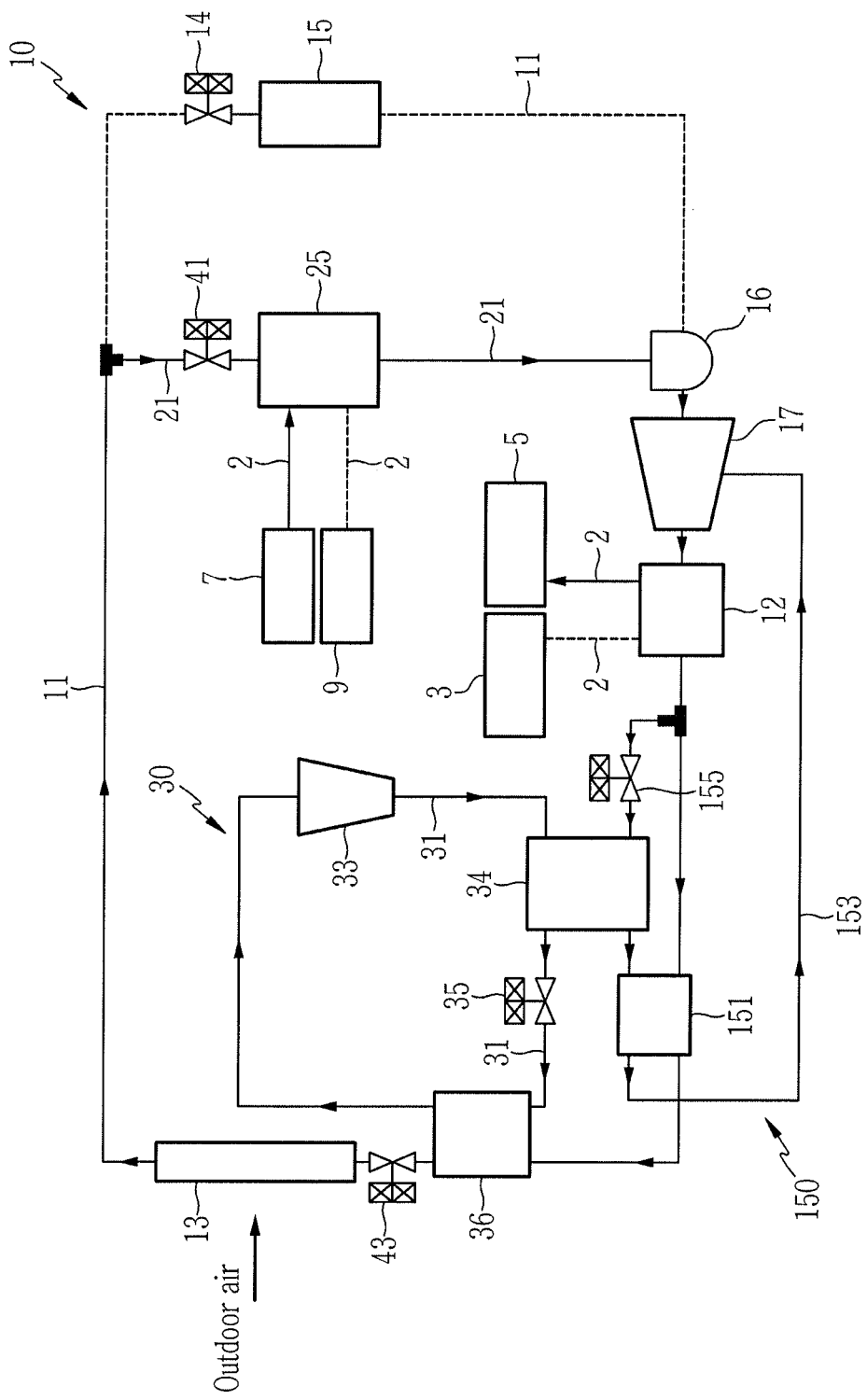
FIG. 7 is an operational state diagram according to a heating mode in a heat pump system for a vehicle according to various exemplary embodiments of the present invention.

FIG. 7 is an operational state diagram according to a heating mode in a heat pump system for a vehicle according to various exemplary embodiments of the present invention.

Referring to FIG. 7, when the waste heat of the electrical component 7 is sufficient, the heat pump system may recover the waste heat of the electrical component 7 to be used for the internal heating.

First, in the air conditioning device 10, the first refrigerant is circuited along the first refrigerant line 11 by operating each of the constituent elements to heat the vehicle interior.

Here, the first refrigerant line 11 connecting the first condenser 12 and the first evaporator 15 is closed through operation of the first expansion valve 14. Also, the coolant connection line 21 connected to the chiller 25 is open through operation of the third expansion valve 41.

In the instant case, the third expansion valve 41 may expand the refrigerant to be supplied to the chiller 25.

Accordingly, the chiller 25 evaporates the first refrigerant by use of the coolant flowed along the coolant line 2 and having an elevated temperature while recovering the waste heat of the electrical component 7.

That is, as the coolant inflowed to the chiller 25 sufficiently absorbs the waste heat from the electrical component 7 to be inflowed in a high temperature state, the chiller 25 may increase the evaporation amount of the first refrigerant.

Next, the first refrigerant passing through the chiller 25 is supplied to the accumulator 16 along the open coolant connection line 21.

The first refrigerant supplied to the accumulator 16 is separated into gas and liquid. Among the first refrigerants separated into gas and liquid, the gaseous refrigerant is supplied to the first compressor 17.

The first refrigerant, compressed from the first compressor 17 with a high temperature and a high pressure flows into the first condenser 12.

Here, the first condenser 12 heat-exchanges the coolant supplied through the coolant line 2 connected to the heater 5 with the first refrigerant of a high temperature and a high pressure supplied from the first compressor 17.

The coolant of which the temperature is increased by heat exchange with the first refrigerant may be supplied to the heater 5 connected through the coolant line 2. Here, the coolant line 2 connected to the radiator 3 is closed.

Accordingly, the coolant of which the temperature is increased while passing through the first condenser 12 is supplied to the heater 5 through operation of the non-illustrated water pump.

That is, the outdoor air inflowed from the outside is inflowed with the uncooled room temperature state when passing through the first evaporator 15 where the first refrigerant is not supplied. The inflowed outdoor air is converted into the high temperature state while passing through the heater 5 and is inflowed into the vehicle interior, realizing the heating of the vehicle interior.

On the other hand, the first condenser 12 condenses the first refrigerant supplied through the first refrigerant line 11 by use of the coolant supplied to the coolant line 2 connected to the heater 5.

The refrigerant passing through the first condenser 12 is inflowed to the heat exchanger 13 along the first refrigerant line 11. The first refrigerant inflowed into the heat exchanger 13 may be further condensed through heat exchange with the outdoor air.

Here, the fourth expansion valve 43 may inflow the first refrigerant into the heat exchanger 13 without expanding the first refrigerant.

The first refrigerant passing through the heat exchanger 13 is supplied to the chiller 25 along the coolant connection line 21 which is open through operation of the third expansion valve 41.

That is, the first refrigerant having passed through the heat exchanger 13 flows through the first refrigerant line 11 to heat the interior of the vehicle, and sequentially passes through the accumulator 16, the first compressor 17, the first condenser 12, and the heat exchanger 13.

On the other hand, in the sub-CE module 30, each of the constituent elements is operated to circulate the second refrigerant along the second refrigerant line 31. Furthermore, each of the constituent elements may be operated in the gas injection unit 150.

Accordingly, some of the first refrigerant passing through the first condenser 12 flows into the bypass line 153.

The first refrigerant inflowed to the bypass line 153 is inflowed to the second condenser 34 in the expanded state through operation of the fifth expansion valve 57.

Thus, the second condenser 34 heat-exchanges the second refrigerant supplied from the second compressor 33 through the second refrigerant line 31 with the first refrigerant which is expanded while passing through the fifth expansion valve 155 in the bypass line 153 to condense the second refrigerant.

The second refrigerant passing through the second condenser 34 expands through operation of the second expansion valve 35 and inflows to the second evaporator 36. Next, the second refrigerant is evaporated through heat exchange with the first refrigerant passing through the plate-type heat exchanger 151 in the second evaporator 36, and is supplied to the second compressor 33 through the second refrigerant line 31.

On the other hand, the first refrigerant passing through the second condenser 34 enters the gaseous state while being heat-exchanged with the rest of the first refrigerant inflowed through the first refrigerant line 11 from the first condenser 12 in the plate-type heat exchanger 151.

The first refrigerant in the gaseous state is supplied to the first compressor 17 through the open bypass line 153.

That is, the gas injection unit 150 again inflows the first refrigerant of the gas state, which undergoes heat transfer while respectively passing through the first and second condensers 12 and 34 and the plate-type heat exchanger 151 to the first compressor 17 through the bypass line 153, increasing the flow rate of the first refrigerant circulating through the first refrigerant line 11.

Also, the first refrigerant exhausted through the first refrigerant line 11 from the plate-type heat exchanger 151 is further condensed while passing through the second evaporator 36. Then, the first refrigerant passing through the second evaporator 36 is inflowed to the heat exchanger 13 along the first refrigerant line 11 which is open through operation of the fourth expansion valve 43.

That is, in another exemplary embodiment of the present invention, the first condenser 12 primary condenses the first refrigerant, and may further condense or evaporate the first refrigerant in the second condenser 34 and the second evaporator 36 by use of the second refrigerant circulating through the sub-CE module 30.

Also, in the gas injection unit 150, the plate-type heat exchanger 151 may mutually heat-exchange the first refrigerant inflowed through the bypass line 153 and the first refrigerant inflowed through the first refrigerant line 11, and bypass the first refrigerant of the gaseous state to the first compressor 17 through the bypass line 151.

The first refrigerant may then be further condensed through heat exchange with the outdoor air in the heat exchanger 13, increasing the condensation amount of the first refrigerant.

The first refrigerant with the increased condensation amount may smoothly recover the waste heat from the coolant supplied from the electrical component 7 in the chiller 25, improving the heating performance and the efficiency.

That is, the heat pump system according to the exemplary embodiment of the present invention utilizes thermal energy generated by the phase change of the second refrigerant in the sub-CE module 30 together with the waste heat of the electrical component 7 in the heating mode of the vehicle, improving the heating efficiency and performance while minimizing the use amount of a separate electric heater.

Furthermore, the gas injection unit 150 increases the flow rate of the first refrigerant, reducing the power consumption of the first compressor 17 and maximizing heating performance.

The operation according to the low temperature dehumidification mode of the vehicle in another exemplary embodiment of the present invention is described with reference to FIG. 8.

Figure 8:
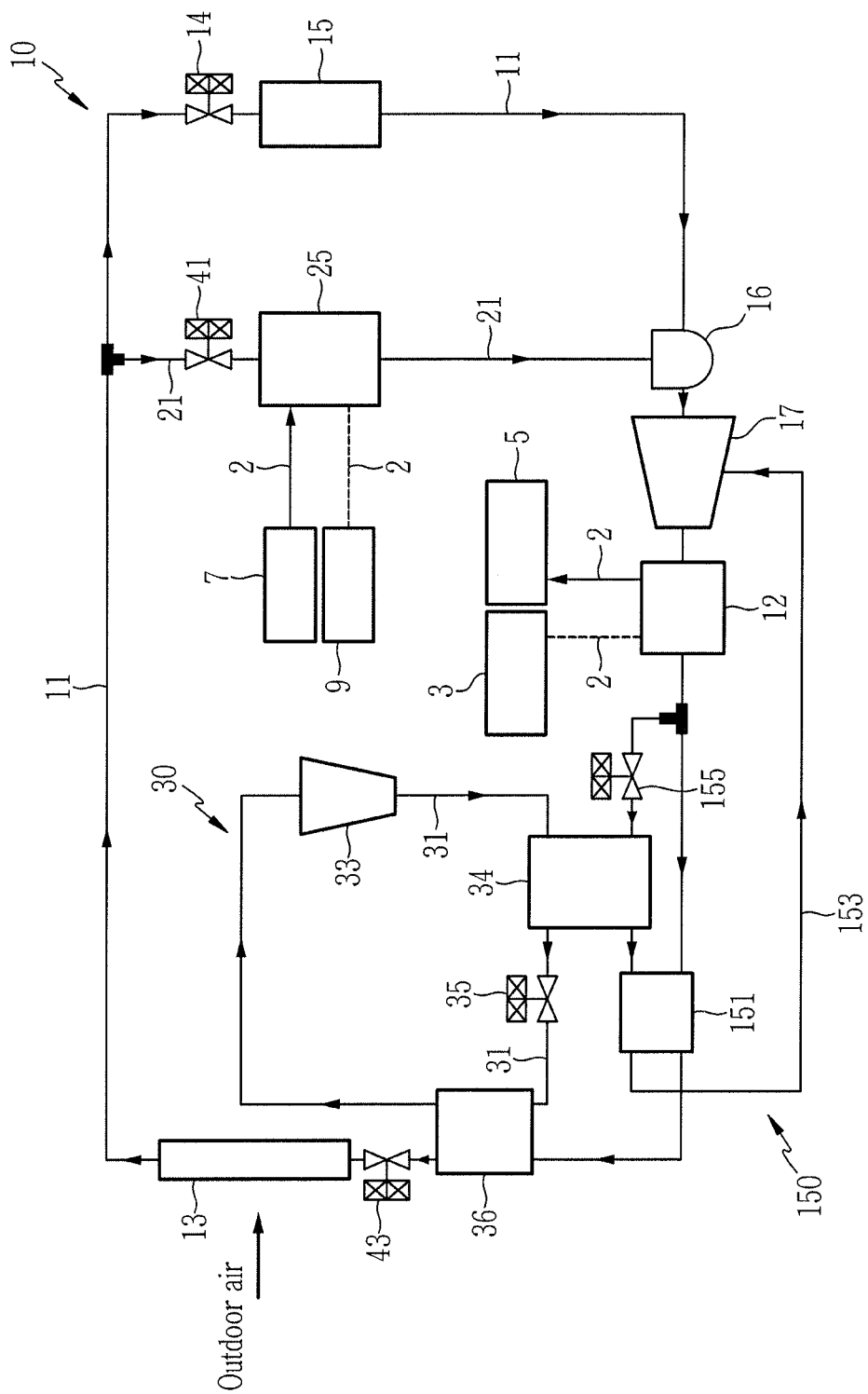
FIG. 8 is an operational state diagram according to a low temperature dehumidification mode in a heat pump system for a vehicle according to various exemplary embodiments of the present invention.

FIG. 8 is an operational state diagram according to a low temperature dehumidification mode in a heat pump system for a vehicle according to various exemplary embodiments of the present invention.

Here, the low temperature dehumidification mode is a mode that operates when dehumidification is required in the vehicle interior in the heating mode of the vehicle.

Referring to FIG. 8, when the waste heat of the electrical component 7 is sufficient, the heat pump system may receive the waste heat of the electrical component 7 to be used for the internal heating.

First, in the air conditioning device 10, each constituent element is operated to heat the vehicle interior, so that the first refrigerant is circulated along the first refrigerant line 11.

Here, the coolant connection line 21, which is connected to the chiller 25, is open through operation of the third expansion valve 41. The third expansion valve 41 may expand the refrigerant to be supplied to the chiller 25.

That is, among the first refrigerant passing through the heat exchanger 13, some of the first refrigerant may be expanded while passing through the third expansion valve 41 and then supplied to the chiller 25.

Accordingly, the chiller 25 evaporates the first refrigerant by use of the coolant that flows along the coolant line 2 and having an elevated temperature while recovering the waste heat of the electrical component 7.

That is, as the coolant inflowed to the chiller 25 sufficiently absorbs the waste heat from the electrical component 7 and flows with a high temperature, the chiller 25 may increase the evaporation amount of the first refrigerant.

Then, the first refrigerant passing through the chiller 25 is supplied to the accumulator 16 along the open coolant connection line 21.

Meanwhile, the first refrigerant line 11, which connects the first condenser 12 and the first evaporator 15, is open through operation of the first expansion valve 14 to dehumidify the interior of the vehicle.

Accordingly, the remaining first refrigerant exhausted from the heat exchanger 13 may be supplied to the first evaporator 15 in the expanded state through operation of the first expansion valve 14 to dehumidify the interior of the vehicle.

The first refrigerant supplied to the accumulator 16 is separated into gas and liquid. Among the first refrigerants separated into gas and liquid, the gaseous refrigerant is supplied to the first compressor 17.

The first refrigerant, compressed from the first compressor 17 to a high temperature and a high pressure, flows into the first condenser 12.

Here, the first condenser 12 heat-exchanges the coolant supplied through the coolant line 2 connected to the heater 5 with the first refrigerant of a high temperature and a high pressure supplied from the first compressor 17.

The coolant of which the temperature is increased by heat exchange with the first refrigerant may be supplied to the heater 5 connected through the coolant line 2. Here, the coolant line 2 connected to the radiator 3 is closed.

Thus, the heater 5 is supplied with the coolant having the temperature increased while passing through the first condenser 12 through operation of a non-illustrated water pump.

On the other hand, the first condenser 12 condenses the first refrigerant supplied through the first refrigerant line 11 by use of the coolant supplied to the coolant line 2 connected to the heater 5.

The refrigerant passing through the first condenser 12 flows into the heat exchanger 13 along the first refrigerant line 11. The first refrigerant inflowed into the heat exchanger 13 may be further condensed through heat exchange with the outdoor air.

Here, the fourth expansion valve 43 may then inflow the first refrigerant into the heat exchanger 13 without expanding the first refrigerant.

The first refrigerant passing through the heat exchanger 13 is supplied to the first evaporator 15 and the chiller 25 along the first refrigerant line 11 and the coolant connection line 21 which is open through operation of the first and third expansion valves 14 and 41, respectively.

That is, the first refrigerant passed through the heat exchanger 13 flows along the first refrigerant line 11 and the coolant connection line 21 to heat the vehicle's internal, and sequentially passes through the chiller 25, the first evaporator 15, the accumulator 16, the compressor 17, the first condenser 12, and the heat exchanger 13.

On the other hand, in the sub-CE module 30, each constituent element is operated to circulate the second refrigerant along the second refrigerant line 31. Furthermore, in the gas injection unit 150, each constituent element may operate.

Accordingly, some of the first refrigerant passing through the first condenser 12 flows into the bypass line 153.

Accordingly, the first refrigerant inflowed to the bypass line 153 is inflowed to the second condenser 34 in the expanded state through operation of the fifth expansion valve 57.

Thus, the second condenser 34 heat-exchanges the second refrigerant supplied from the second compressor 33 through the second refrigerant line 31 with the first refrigerant which is expanded while passing through the fifth expansion valve 155 in the bypass line 153 to condense the second refrigerant.

The second refrigerant passing through the second condenser 34 expands through operation of the second expansion valve 35 and inflows to the second evaporator 36. Next, the second refrigerant is evaporated through heat exchange with the first refrigerant passing through the plate-type heat exchanger 151 in the second evaporator 36, and is supplied to the second compressor 33 through the second refrigerant line 31.

On the other hand, the first refrigerant passing through the second condenser 34 enters the gaseous state while being heat-exchanged with the rest of the first refrigerant inflowed through the first refrigerant line 11 from the first condenser 12 in the plate-type heat exchanger 151.

The first refrigerant of the gaseous state is supplied to the first compressor 17 through the open bypass line 153.

That is, the gas injection unit 150 again inflows the first refrigerant of the gas state, which undergoes heat transfer while respectively passing through the first and second condensers 12 and 34 and the plate-type heat exchanger 151 to the first compressor 17 through the bypass line 153, increasing the flow rate of the first refrigerant circulating through the first refrigerant line 11.

Also, the first refrigerant exhausted through the first refrigerant line 11 from the plate-type heat exchanger 151 is further condensed while passing through the second evaporator 36. Then, the first refrigerant passing through the second evaporator 36 is inflowed to the heat exchanger 13 along the first refrigerant line 11 which is open through operation of the fourth expansion valve 43.

That is, in another exemplary embodiment of the present invention, the first condenser 12 primary condenses the first refrigerant, and may further condense or evaporate the first refrigerant in the second condenser 34 and the second evaporator 36 by use of the second refrigerant circulating through the sub-CE module 30.

Also, in the gas injection unit 150, the plate-type heat exchanger 151 may mutually heat-exchange the first refrigerant inflowed through the bypass line 153 and the first refrigerant inflowed through the first refrigerant line 11, and bypass the first refrigerant of the gaseous state to the first compressor 17 through the bypass line 151.

The first refrigerant may then be further condensed through heat exchange with the outdoor air in the heat exchanger 13, increasing the condensation amount of the first refrigerant.

The first refrigerant with the increased condensation amount may smoothly recover the waste heat from the coolant supplied from the electrical component 7 in the chiller 25, improving the heating performance and the efficiency.

Accordingly, the outdoor air inflowed from the outside is dehumidified as it passes through the first evaporator 15 supplied with the first refrigerant.

The outdoor air dehumidified while passing through the first evaporator 15 is converted to a high temperature state while passing through the heater 5 and inflows into the vehicle interior, heating and dehumidifying the vehicle interior.

As described above, the heat pump system according to the exemplary embodiment of the present invention utilizes thermal energy generated by the phase change of the second refrigerant in the sub-CE module 30 together with the waste heat of the electrical component 7 in the low temperature dehumidification mode, improving the heating efficiency and performance while minimizing the use amount of a separate electric heater.

Furthermore, the gas injection unit 50 increases the flow rate of the first refrigerant, reducing the power consumption of the first compressor 17 and maximizing heating performance, and the internal dehumidification may be performed together by selectively supplying the first refrigerant which is expanded by the first evaporator 15.

Therefore, as described above, if the heat pump system for the vehicle according to the exemplary embodiments of the present invention is applied, the chiller 25 in which the coolant and the first refrigerant are heat-exchanged is used to control the temperature of the battery module 9 according to the mode of the vehicle in the electric vehicle, simplifying the system.

Also, the present invention may reduce the entire refrigerant amount and improve heating efficiency and performance while minimizing use of an electric heater by use of the sub-CE module 30 along with the waste heat of the electrical component 7 in the heating mode of the vehicle.

Furthermore, the present invention may efficiently adjust the temperature of the battery module 9, exhibiting optimum performance of the battery module 9, and increase the overall travel distance of the vehicle by managing the battery module 9 efficiently.

Furthermore, the present invention may increase the flow rate of the refrigerant by applying the gas injection units 50 and 150, reducing the power consumption of the first compressor 17 and maximizing the heating performance.

Furthermore, the present invention may reduce manufacturing cost and weight by simplifying the entire system and improve space utilization.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the system including:
   an air conditioning device connected by a first refrigerant line circulated with a first refrigerant wherein the air conditioning device includes a first condenser, a first expansion valve, a first evaporator, and a first compressor;
   a refrigerant connection line including a first portion connected to the first refrigerant line between the first condenser and the first evaporator and a second portion connected to the first refrigerant line between the first evaporator and the first compressor;
   a chiller provided in the refrigerant connection line, the refrigerant connection line being connected to an electric device and a battery module through a first coolant line connecting the chiller to the electric device and the battery module, wherein the chiller heat-exchanges a coolant in the first coolant line with the first refrigerant;
   a sub-centralized energy (CE) module connected to the air conditioning device through the first refrigerant line, wherein the sub-CE module includes a second refrigerant line and selectively heat-exchanges thermal energy generated when condensing and evaporating a second refrigerant along the second refrigerant line, with the first refrigerant to adjust a temperature of the first refrigerant, wherein the first refrigerant line and the second refrigerant line are thermally connected by a second evaporator and a second condenser; and
   a gas injection unit mounted in the air conditioning device and bypassing a part of the first refrigerant passing through the first condenser in a heating mode or a low temperature dehumidification mode of the vehicle to the first compressor to increase a flow rate of the first refrigerant circulating through the first refrigerant line,
   wherein the sub-CE module includes:
      a second compressor compressing the second refrigerant;
      the second condenser connected to the second compressor through the second refrigerant line, wherein the second condenser heat-exchanges the compressed second refrigerant supplied from the second compressor with the first refrigerant to be condensed;
      a second expansion valve connected to the second condenser through the second refrigerant line, wherein the second expansion valve is configured for expanding the second refrigerant; and
      the second evaporator connected to the second expansion valve through the second refrigerant line, wherein the second evaporator is connected to the first refrigerant line, and wherein the second evaporator is configured to evaporate the second refrigerant supplied from the second expansion valve through heat exchange with the first refrigerant inflowed through the first refrigerant line and to supply the evaporated second refrigerant to the second compressor,
   wherein the air conditioning device further includes a heat exchanger mounted on the first refrigerant line between the first condenser and the first expansion valve, and
   wherein a third expansion valve configured of controlling a movement flow of the first refrigerant inflowed to the chiller and selectively expanding the first refrigerant is mounted on the refrigerant connection line, and
   wherein a fourth expansion valve is mounted on the first refrigerant line between the second evaporator and the heat exchanger.

2. The heat pump system for the vehicle of claim 1, wherein the second condenser is mounted on the first refrigerant line between the first condenser and the first expansion valve, and
wherein the second evaporator is mounted on the first refrigerant line between the first condenser and the first expansion valve so that the first refrigerant passing through the second condenser is flown into the second evaporator.

3. The heat pump system for the vehicle of claim 1,
wherein the third expansion valve is configured to expand the first refrigerant inflowed to the refrigerant connection line when cooling the battery module by use of the coolant inflowed to the chiller and heat-exchanged with the first refrigerant.

4. The heat pump system for the vehicle of claim 1,
wherein the heat exchanger further condenses or evaporates the first refrigerant condensed in the first condenser through heat exchange with outdoor air according to a selective operation of the fourth expansion valve.

5. The heat pump system for the vehicle of claim 1,
wherein the first, third, and fourth expansion valve are each an electric expansion valve configured of selectively expanding the first refrigerant while controlling a movement flow of the refrigerant.

6. The heat pump system for the vehicle of claim 1,
wherein the second compressor is formed with a capacity smaller than a capacity of the first compressor.

7. The heat pump system for the vehicle of claim 1,
wherein the gas injection unit is simultaneously operated with the sub-CE module in the heating mode or the low temperature dehumidification mode of the vehicle.

8. The heat pump system for the vehicle of claim 1,
wherein the first condenser is respectively connected to a radiator and a heater through a second coolant line, and the first condenser heat-exchanges a coolant inflowed in the first condenser with the first refrigerant of the first refrigerant line to condense the first refrigerant.

9. The heat pump system for the vehicle of claim 8,
wherein the first condenser supplies the coolant in the first condenser in which temperature of the coolant in the first condenser is increased while condensing the first refrigerant in the heating mode, the low temperature dehumidification mode, and a high temperature dehumidification mode of the vehicle to the heater through the second coolant line.

10. The heat pump system for the vehicle of claim 1,
wherein the chiller is respectively connected to the electric device and the battery module through the first coolant line, and the chiller absorbs waste heat of the electric device while heat-exchanging the coolant of the first coolant line with the first refrigerant or supplies the coolant of the first coolant line at a temperature lower than a predetermined value such that the first coolant line undergoes heat transfer with the first refrigerant to exchange heat with the battery module.

11. The heat pump system for the vehicle of claim 1,
wherein the air conditioning device further includes an accumulator mounted on the first refrigerant line between the first evaporator and the first compressor, and
wherein the refrigerant connection line connects the first refrigerant line and the accumulator between the first condenser and the first expansion valve so that the first refrigerant passing through the chiller inflows to the first compressor through the accumulator.

12. The heat pump system for the vehicle of claim 1,
wherein the first refrigerant and the second refrigerant consist of different refrigerants.

13. A heat pump system for a vehicle, the system including:
an air conditioning device connected by a first refrigerant line circulated with a first refrigerant wherein the air conditioning device includes a first condenser, a first expansion valve, a first evaporator, and a first compressor;
a refrigerant connection line including a first portion connected to the first refrigerant line between the first condenser and the first evaporator and a second portion connected to the first refrigerant line between the first evaporator and the first compressor;
a chiller provided in the refrigerant connection line, the refrigerant connection line being connected to an electric device and a battery module through a first coolant line connecting the chiller to the electric device and the battery module, wherein the chiller heat-exchanges a coolant in the first coolant line with the first refrigerant;
a sub-centralized energy (CE) module connected to the air conditioning device through the first refrigerant line, wherein the sub-CE module includes a second refrigerant line and selectively heat-exchanges thermal energy generated when condensing and evaporating a second refrigerant along the second refrigerant line, with the first refrigerant to adjust a temperature of the first refrigerant, wherein the first refrigerant line and the second refrigerant line are thermally connected by a second evaporator and a second condenser; and
a gas injection unit mounted in the air conditioning device and bypassing a part of the first refrigerant passing through the first condenser in a heating mode or a low temperature dehumidification mode of the vehicle to the first compressor to increase a flow rate of the first refrigerant circulating through the first refrigerant line,
wherein the sub-CE module includes:
a second compressor compressing the second refrigerant;
the second condenser connected to the second compressor through the second refrigerant line, wherein the second condenser heat-exchanges the compressed second refrigerant supplied from the second compressor with the first refrigerant to be condensed;
a second expansion valve connected to the second condenser through the second refrigerant line, wherein the second expansion valve is configured for expanding the second refrigerant; and
the second evaporator connected to the second expansion valve through the second refrigerant line, wherein the second evaporator is connected to the first refrigerant line, and wherein the second evaporator is configured to evaporate the second refrigerant supplied from the second expansion valve through heat exchange with the first refrigerant inflowed through the first refrigerant line and to supply the evaporated second refrigerant to the second compressor,
wherein the second condenser is mounted on the first refrigerant line between the first condenser and the first expansion valve,
wherein the second evaporator is mounted on the first refrigerant line between the first condenser and the first expansion valve so that the first refrigerant passing through the second condenser is flown into the second evaporator, and
wherein the gas injection unit includes:
a flash tank mounted on the first refrigerant line between the second condenser and the first expansion valve wherein the flash tank divides the first refrigerant passing through the second condenser into a gaseous refrigerant and a liquid refrigerant to be selectively exhausted;

a bypass line connecting the flash tank and the first compressor wherein the bypass line selectively supplies the gaseous refrigerant from the flash tank to the first compressor;
a valve mounted on the bypass line; and
a fifth expansion valve mounted on the first refrigerant line between the first condenser and the flash tank.

14. The heat pump system for the vehicle of claim 13, wherein the fifth expansion valve is configured to expand the first refrigerant passing through the first condenser in the heating mode or the low temperature dehumidification mode of the vehicle.

15. A heat pump system for a vehicle, the system including:
an air conditioning device connected by a first refrigerant line circulated with a first refrigerant wherein the air conditioning device includes a first condenser, a first expansion valve, a first evaporator, and a first compressor;
a refrigerant connection line connecting a first portion of the first refrigerant line between the first condenser and the first evaporator and a second portion of the first refrigerant line between the first evaporator and the first compressor;
a refrigerant connection line including a first portion connected to the first refrigerant line between the first condenser and the first evaporator and a second portion connected to the first refrigerant line between the first evaporator and the first compressor;
a chiller provided in the refrigerant connection line, the refrigerant connection line being connected to an electric device and a battery module through a first coolant line connecting the chiller to the electric device and the battery module, wherein the chiller heat-exchanges a coolant in the first coolant line with the first refrigerant;
a sub-centralized energy (CE) module connected to the air conditioning device through the first refrigerant line, wherein the sub-CE module includes a second refrigerant line and selectively heat-exchanges thermal energy generated when condensing and evaporating a second refrigerant along the second refrigerant line, with the first refrigerant to adjust a temperature of the first refrigerant, wherein the first refrigerant line and the second refrigerant line are thermally connected by a second evaporator and a second condenser; and
a gas injection unit mounted in the air conditioning device and bypassing a part of the first refrigerant passing through the first condenser in a heating mode or a low temperature dehumidification mode of the vehicle to the first compressor to increase a flow rate of the first refrigerant circulating through the first refrigerant line,
wherein the sub-CE module includes:
a second compressor compressing the second refrigerant;
the second condenser connected to the second compressor through the second refrigerant line, wherein the second condenser heat-exchanges the compressed second refrigerant supplied from the second compressor with the first refrigerant to be condensed;
a second expansion valve connected to the second condenser through the second refrigerant line, wherein the second expansion valve is configured for expanding the second refrigerant; and
the second evaporator connected to the second expansion valve through the second refrigerant line, wherein the second evaporator is connected to the first refrigerant line, and wherein the second evaporator is configured to evaporate the second refrigerant supplied from the second expansion valve through heat exchange with the first refrigerant inflowed through the first refrigerant line and to supply the evaporated second refrigerant to the second compressor,
wherein the gas injection unit includes:
a plate-type heat exchanger mounted on the first refrigerant line between the first condenser and the first expansion valve;
a bypass line having a first end portion connected to the first refrigerant line between the first condenser and the plate-type heat exchanger and a second end portion connected to the first compressor through the second condenser and the plate-type heat exchanger; and
a fifth expansion valve mounted on the bypass line at front of the second condenser.

16. The heat pump system for the vehicle of claim 15, wherein the second condenser is mounted on the bypass line between the first condenser and the plate-type heat exchanger, and
wherein the second evaporator is mounted on the first refrigerant line between the first condenser and the first expansion valve so that the first refrigerant passing through the second condenser is flown into the second evaporator.

17. The heat pump system for the vehicle of claim 15, wherein the fifth expansion valve is configured to expand the first refrigerant inflowed to the bypass line through the first condenser in the heating mode or the low temperature dehumidification mode of the vehicle.

* * * * *